(12) United States Patent
Kim et al.

(10) Patent No.: US 12,379,125 B2
(45) Date of Patent: Aug. 5, 2025

(54) AIR CONDITIONER, AIR CONDITIONER CONTROL METHOD, AND AIR CONDITIONER CONTROL SYSTEM

(71) Applicant: Samsung Electronics Co., Ltd., Suwon-si (KR)

(72) Inventors: Kyungjae Kim, Suwon-si (KR); Jooyoo Kim, Suwon-si (KR); Hyungseon Song, Suwon-si (KR); Dongjun Shin, Suwon-si (KR); Miyoung Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 542 days.

(21) Appl. No.: 17/829,767

(22) Filed: Jun. 1, 2022

(65) Prior Publication Data
US 2022/0381472 A1 Dec. 1, 2022

(30) Foreign Application Priority Data
Jun. 1, 2021 (KR) .................. 10-2021-0071088

(51) Int. Cl.
*F24F 11/63* (2018.01)
*F24F 11/56* (2018.01)
(Continued)

(52) U.S. Cl.
CPC .............. *F24F 11/63* (2018.01); *F24F 11/56* (2018.01); *F24F 11/77* (2018.01); *G05B 19/042* (2013.01);
(Continued)

(58) Field of Classification Search
CPC .. F24F 11/63; F24F 11/56; F24F 11/77; F24F 2110/10; F24F 2110/12; F24F 2110/20;
(Continued)

(56) References Cited

U.S. PATENT DOCUMENTS 5,415,346 A * 5/1995 Bishop ............... G05D 23/1917
236/78 D
5,934,084 A * 8/1999 Lee ........................... F24F 3/14
62/93
(Continued)

FOREIGN PATENT DOCUMENTS

CA 3058373 A1 * 10/2018 .............. F24F 11/58
KR 10-2006-0030765 A 4/2006
(Continued)

*Primary Examiner* — Chun Cao
*Assistant Examiner* — Michael Tang
(74) *Attorney, Agent, or Firm* — STAAS & HALSEY LLP

(57) ABSTRACT

An air conditioner includes a communication interface to communicate with a server device, a memory to store one or more instructions, and at least one processor configured to execute the stored one or more instructions to transmit, to the server device through the communication interface, current state information including one or more of operation time information of the air conditioner, set temperature information of the air conditioner, and current indoor temperature information, receive a set temperature increase request corresponding to the transmitted current state information from the server device through the communication interface, and adjust a set temperature of the air conditioner based on the received set temperature increase request, and the set temperature increase request is received when an overcooling period is identified.

17 Claims, 26 Drawing Sheets

(51) Int. Cl.
*F24F 11/77* (2018.01)
*G05B 19/042* (2006.01)
*F24F 110/10* (2018.01)
*F24F 110/12* (2018.01)
*F24F 110/20* (2018.01)
*F24F 110/22* (2018.01)
*F24F 110/30* (2018.01)

(52) U.S. Cl.
CPC ....... *F24F 2110/10* (2018.01); *F24F 2110/12* (2018.01); *F24F 2110/20* (2018.01); *F24F 2110/22* (2018.01); *F24F 2110/30* (2018.01); *G05B 2219/2614* (2013.01)

(58) Field of Classification Search
CPC .... F24F 2110/22; F24F 2110/30; F24F 11/80; F24F 11/62; F24F 11/64; F24F 11/72; F24F 2130/10; G05B 19/042; G05B 2219/2614; G05B 13/0265; G05B 15/02; G06N 20/00

USPC ......................................................... 700/180
See application file for complete search history.

(56) References Cited

U.S. PATENT DOCUMENTS

| | | |
|---|---|---|
| 2008/0209928 A1 | 9/2008 | Hwang et al. |
| 2017/0254555 A1* | 9/2017 | Tae ........................... F24F 11/61 |
| 2019/0212026 A1* | 7/2019 | Kim .......................... F24F 11/65 |
| 2019/0271483 A1 | 9/2019 | Joo et al. |
| 2020/0334574 A1* | 10/2020 | Ishida ................. G06F 11/3058 |
| 2021/0041121 A1 | 2/2021 | Park et al. |
| 2022/0196306 A1* | 6/2022 | Grinshtain ............. G05B 15/02 |

FOREIGN PATENT DOCUMENTS

| | | |
|---|---|---|
| KR | 10-0717444 B1 | 5/2007 |
| KR | 10-2019-0109640 A | 9/2019 |
| KR | 10-2069574 B1 | 2/2020 |

* cited by examiner

AIR CONDITIONER, AIR CONDITIONER CONTROL METHOD, AND AIR CONDITIONER CONTROL SYSTEM

CROSS-REFERENCE TO RELATED APPLICATION

This application is based on and claims priority under 35 U.S.C. § 119 to Korean Patent Applications No. 10-2021-0071088, filed on Jun. 1, 2021, in the Korean Intellectual Property Office, the disclosure of which is incorporated by reference herein in its entirety

BACKGROUND

1. Field

The disclosure relates to an air conditioner, an operating method of the air conditioner, and a control system including the air conditioner and a server device. More particularly, the disclosure relates to a control system for optimizing a set temperature or a fan speed of an air conditioner by using artificial intelligence (AI) models.

2. Description of the Related Art

Artificial intelligence (AI) systems are computer systems capable of implementing human-level intelligence, and refer to systems by which a machine autonomously learns, makes decisions, and becomes smarter, unlike existing rule-based smart systems. Because the AI systems may increase a recognition rate and more accurately understand user preferences in proportion to the number of iterations, the existing rule-based smart systems are being gradually replaced by deep-learning-based AI systems.

AI technology includes machine learning (e.g., deep learning), and element technologies using machine learning.

Machine learning is an algorithm technology for autonomously classifying/learning features of input data, and the element technologies are technologies for mimicking functions of the human brain, e.g., recognition and decision making, by using a machine learning algorithm such as deep learning, and include linguistic understanding, visual understanding, reasoning/prediction, knowledge representation, operation control, etc.

Various fields using AI technology are as described below. Linguistic understanding is a technology for recognizing and applying/processing human languages/characters, and includes natural language processing, machine translation, dialog systems, question answering, speech recognition/synthesis, etc. Visual understanding is a technology for recognizing and processing objects like human vision, and includes object detection, object tracking, image search, human detection, scene understanding, spatial understanding, image enhancement, etc. Reasoning/prediction is a technology for logically performing reasoning and prediction based on information, and includes knowledge/probability-based reasoning, optimized prediction, preference-based planning, recommendation, etc. Knowledge representation is a technology for automating human experience information into knowledge data, and includes knowledge construction (e.g., data generation/classification), knowledge management (data utilization), etc. Operation control is a technology for controlling autonomous driving of vehicles or motion of robots, and includes motion control (e.g., navigation, collision avoidance, and driving control), manipulation control (e.g., action control), etc.

Currently, to provide a comfortable environment to a user, many attempts are being made to apply AI technology to home appliances such as robot vacuums, air conditioners, air purifiers, washers, and dryers.

SUMMARY

According to various embodiments of the disclosure, a method and system for optimizing a set temperature or a fan speed of an air conditioner may be provided. More particularly, according to various embodiments of the disclosure, a method and system for controlling a set temperature or a fan speed of an air conditioner by using artificial intelligence (AI) models to prevent an overcooling period in which an indoor temperature is reduced below a comfortable temperature may be provided.

According to an embodiment of the disclosure, an air conditioner includes a communication interface to communicate with a server device, a memory to store one or more instructions, and at least one processor. The at least one processor of the air conditioner is configured to execute the one or more instructions to transmit, to the server device through the communication interface, current state information including one or more of operation time information of the air conditioner, set temperature information of the air conditioner, and current indoor temperature information, receive a set temperature increase request corresponding to the transmitted current state information from the server device through the communication interface, and adjust a set temperature of the air conditioner based on the received set temperature increase request. A comfortable temperature graph is obtained from a first Artificial Intelligence (AI) model and a first predicted temperature graph is obtained from a second AI model based on the transmitted current state information, and the set temperature increase request is received when an overcooling period, in which the obtained first predicted temperature graph is reduced below the obtained comfortable temperature graph, is identified.

The comfortable temperature graph comprises an unstable period in which a comfortable temperature changes based on an operation time of the air conditioner, and a stable period in which the comfortable temperature is constantly maintained.

The comfortable temperature graph is obtained by applying one or more of operation timing information of the air conditioner, fan speed information of the air conditioner, indoor humidity information, outdoor humidity information, indoor temperature information, and outdoor temperature information to the first AI model.

The set temperature increase request comprises information instructing to change the set temperature of the air conditioner to a first temperature, and the first temperature is determined from among one or more set temperatures, based on a result of comparing the comfortable temperature graph to one or more second predicted temperature graphs obtained by inputting the one or more set temperatures to the second AI model.

A second predicted temperature graph obtained by applying the first temperature to the second AI model is not reduced below the comfortable temperature graph and is closest to the comfortable temperature graph.

The processor is further configured to execute the one or more instructions to receive a fan speed reduction request from the server device corresponding to the transmitted current state information, and adjust a fan speed of the air conditioner based on the fan speed reduction request.

The first predicted temperature graph is obtained by further applying one or more of operation timing information of the air conditioner, indoor humidity information, outdoor temperature information, outdoor humidity information, weather information, performance information of the air conditioner, and installation space information of the air conditioner to the second AI model.

According to an embodiment of the disclosure, an operating method of an air conditioner includes transmitting, to a server device, current state information including one or more of operation time information of the air conditioner, set temperature information of the air conditioner, and current indoor temperature information, receiving a set temperature increase request corresponding to the transmitted current state information from the server device, and adjusting a set temperature of the air conditioner based on the set temperature increase request, a comfortable temperature graph is obtained from a first Artificial Intelligence (AI) model and a first predicted temperature graph is obtained from a second AI model based on the transmitted current state information, and the set temperature increase request is received when an overcooling period, in which the obtained first predicted temperature graph is reduced below the obtained comfortable temperature graph, is identified.

The comfortable temperature graph may include an unstable period in which a comfortable temperature changes based on an operation time of the air conditioner, and a stable period in which the comfortable temperature is constantly maintained, and be obtained by applying one or more of operation timing information of the air conditioner, fan speed information of the air conditioner, indoor humidity information, outdoor humidity information, indoor temperature information, and outdoor temperature information to the first AI model.

The set temperature increase request may include information instructing to change the set temperature of the air conditioner to a first temperature, and the server device may be further configured to determine the first temperature from among one or more set temperatures, based on a result of comparing the comfortable temperature graph to one or more second predicted temperature graphs obtained by inputting the one or more set temperatures to the second AI model.

A second predicted temperature graph obtained by applying the first temperature to the second AI model may not be reduced below the comfortable temperature graph and be closest to the comfortable temperature graph.

The air conditioner may be further configured to receive a fan speed reduction request from the server device corresponding to the transmitted current state information, and adjust a fan speed of the air conditioner based on the fan speed reduction request.

The server device may be further configured to obtain the first predicted temperature graph from the second AI model by further applying one or more of operation timing information of the air conditioner, indoor humidity information, outdoor temperature information, outdoor humidity information, weather information, performance information of the air conditioner, or installation space information of the air conditioner to the second AI model.

A control system comprises an air conditioner configured to transmit, to a server device, current state information comprising one or more of operation time information of the air conditioner, set temperature information of the air conditioner, and current indoor temperature information, and adjust a set temperature of the air conditioner based on a set temperature increase request, corresponding to the transmitted current state information, received from the server device, and the server device configured to transmit the set temperature increase request to the air conditioner when an overcooling period, is identified.

A comfortable temperature graph is obtained from a first Artificial Intelligence (AI) model and a first predicted temperature graph is obtained from a second AI model based on the transmitted current state information, and the overcooling period is a period when the obtained first predicted temperature is reduced below the obtained comfortable temperature graph.

The comfortable temperature graph comprises an unstable period in which a comfortable temperature changes based on an operation time of the air conditioner, and a stable period in which the comfortable temperature is constantly maintained, and is obtained by applying one or more of operation timing information of the air conditioner, fan speed information of the air conditioner, indoor humidity information, outdoor humidity information, indoor temperature information, and outdoor temperature information to the first AI model.

The set temperature increase request comprises information instructing to change the set temperature of the air conditioner to a first temperature, and the server device is further configured to determine the first temperature from among one or more set temperatures, based on a result of comparing the comfortable temperature graph to one or more second predicted temperature graphs obtained by inputting the one or more set temperatures to the second AI model.

A second predicted temperature graph obtained by applying the first temperature to the second AI model is not reduced below the comfortable temperature graph and is closest to the comfortable temperature graph.

The air conditioner is further configured to receive a fan speed reduction request from the server device corresponding to the transmitted current state information, and adjust a fan speed of the air conditioner based on the fan speed reduction request.

The server device is further configured to obtain the first predicted temperature graph from the second AI model by further applying one or more of operation timing information of the air conditioner, indoor humidity information, outdoor temperature information, outdoor humidity information, weather information, performance information of the air conditioner, and installation space information of the air conditioner to the second AI model.

DETAILED DESCRIPTION

Figure 1:
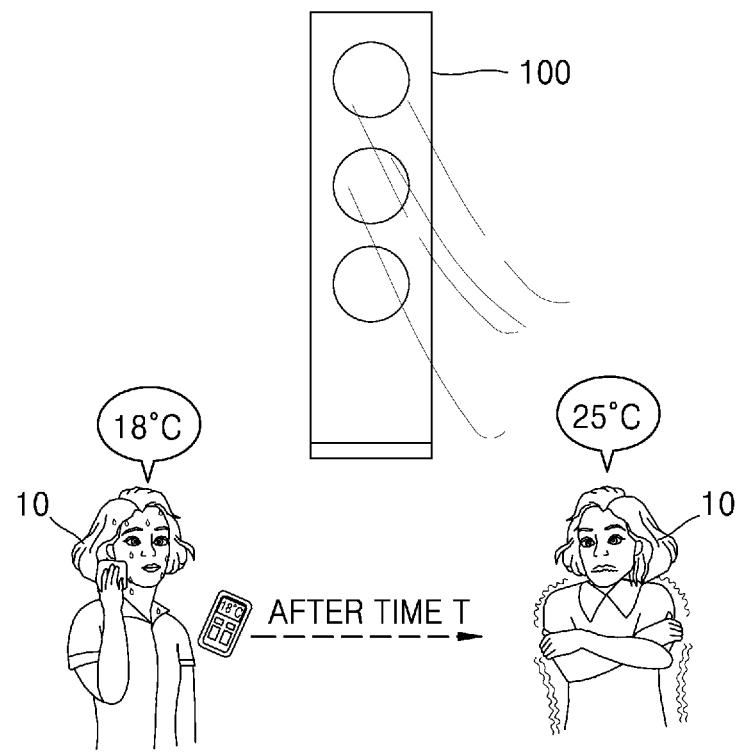
FIG. 1 is a diagram for describing a general air conditioner control system.
Figure 1:
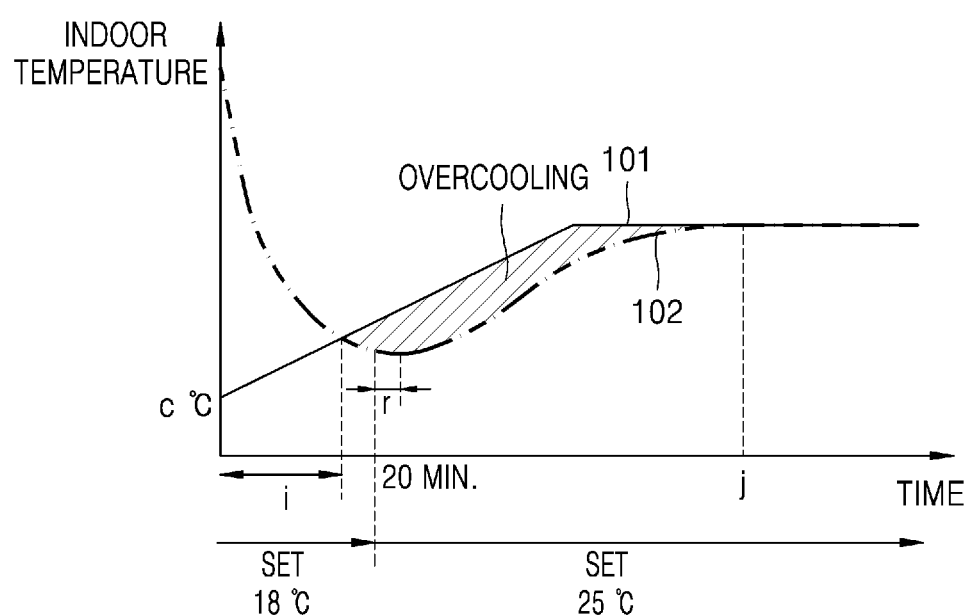

Throughout the disclosure, the expression "at least one of a, b or c" indicates only a, only b, only c, both a and b, both a and c, both b and c, all of a, b, and c, or variations thereof.

Terminology used in this specification will now be briefly described before describing embodiments of the disclosure in detail.

Although the terms used herein are selected, as much as possible, from general terms that are widely used at present while taking into consideration the functions obtained in accordance with the disclosure, these terms may be replaced by other terms based on intentions of one of ordinary skill in the art, customs, emergence of new technologies, or the like. In a particular case, terms that are arbitrarily selected by the applicant may be used and, in that case, the meanings of these terms may be described in relevant parts of the disclosure. Therefore, it is noted that the terms used herein are construed based on practical meanings thereof and the whole content of this specification, rather than being simply construed based on the names of the terms.

It will be understood that the terms "comprises", "comprising", "includes" and/or "including", when used herein, specify the presence of stated elements, but do not preclude the presence or addition of one or more other elements, unless otherwise indicated herein. As used herein, the term "unit" or "module" denotes an entity for performing at least one function or operation, and may be implemented as hardware, software, or a combination of hardware and software.

Hereinafter, the disclosure will be described in detail by explaining embodiments of the disclosure with reference to the attached drawings. The disclosure may, however, be embodied in many different forms and should not be construed as being limited to the embodiments of the disclosure set forth herein. In the drawings, parts not related to the disclosure are not illustrated for clarity of explanation, and like reference numerals denote like elements throughout.

FIG. 1 is a diagram for describing a general air conditioner control system.

In general, when a user 10 comes indoors after outdoor activities, the user 10 may feel very hot due to a high active metabolic rate. In this case, the user 10 may operate a general air conditioner 100 by setting a desired temperature of the air conditioner 100 to the lowest temperature, e.g., 18° C. When a time T has elapsed after the air conditioner 100 starts to operate, the active metabolic rate of the user 10 is stabled and the user 10 feels cold. In this case, the user 10 may turn off the air conditioner 100 or increase the set temperature of the air conditioner 100 to 25° C. However, the user 10 has already felt cold and thus experiences discomfort due to overcooling.

Discomfort experienced by the user 10 with the general air conditioner control system will now be described in more detail with reference to graphs 101 and 102 of FIG. 1.

Referring to a comfortable temperature graph 101 indicating a set of temperatures at which the user 10 feels comfortable, the user 10 feels hot at first and thus feels comfortable at a low temperature, e.g., c ° C. However, because heat escapes from the body of the user 10 over time, the temperature at which the user 10 feels comfortable is gradually increased. After the temperature at which the user 10 feels comfortable is increased to a specific temperature, the temperature at which the user 10 feels comfortable is maintained at the specific temperature.

Meanwhile, referring to an indoor temperature change graph 102, when the user 10 feels hot at first and thus inputs 18° C. as the set temperature, an indoor temperature is gradually reduced. At a timing when 20 minutes have elapsed after the air conditioner 100 starts to operate, the user 10 may feel cold and change the set temperature to 25° C. In this case, the indoor temperature is not immediately increased due to thermal inertia, but is further reduced during a time r and then is increased after the time r has elapsed. When the comfortable temperature graph 101 is compared to the indoor temperature change graph 102, although the user 10 feels cold and changes the set temperature to 25° C. after 20 minutes, overcooling that makes the user 10 feel cold already occurs from a timing i before the user 10 changes the set temperature. Overcooling may mean that an indoor temperature is reduced below a comfortable temperature of the user 10. Therefore, from the timing i after the user 10 operates the air conditioner 100 to a timing j when the indoor temperature becomes similar to the comfortable temperature, the user 10 continuously feels cold and experiences discomfort due to overcooling.

As such, according to the general air conditioner control system for controlling the set temperature through training merely based on a history of temperatures set by the user 10, the set temperature is controlled after the user 10 already experiences discomfort, and a time for which the user 10 feels uncomfortable is increased. Therefore, a system for efficiently controlling the set temperature of the air conditioner 100 before the user 10 feels uncomfortable due to overcooling is required. The system for controlling the set temperature of the air conditioner 100 before the user 10 feels uncomfortable due to overcooling, by using artificial intelligence (AI) models, according to an embodiment of the disclosure, will now be described with reference to FIG. 2.

Figure 2:
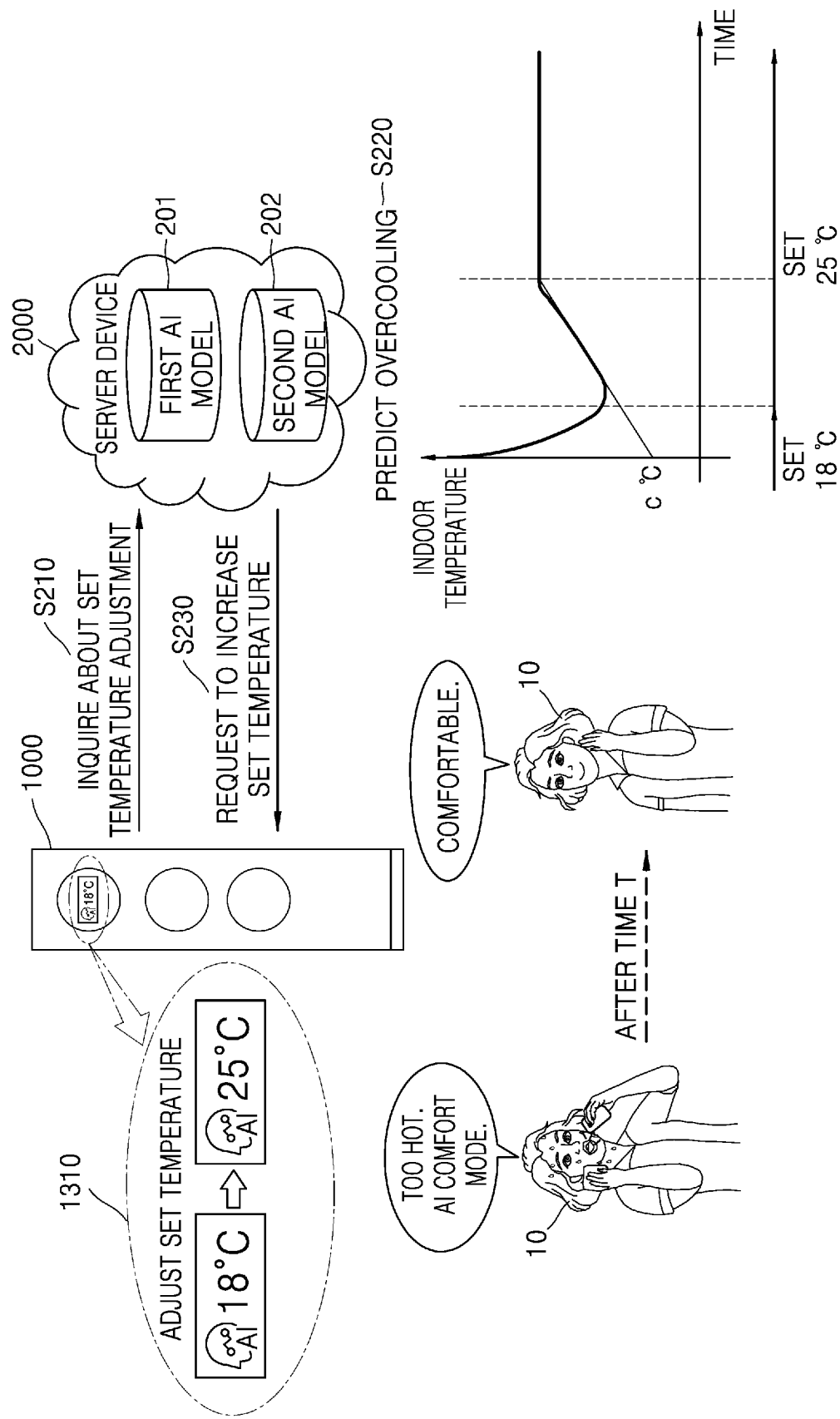
FIG. 2 is a diagram for describing an air conditioner control system according to an embodiment of the disclosure.

FIG. 2 is a diagram for describing an air conditioner control system according to an embodiment of the disclosure.

The air conditioner control system (hereinafter shortened to the control system) according to an embodiment of the disclosure may include an air conditioner 1000 and a server device 2000. However, not all of the illustrated elements are required. The control system may be implemented with more or less elements than the illustrated elements. For example, the control system may further include a display device (e.g., a mobile device) connected to the server device 2000. The display device (not shown) may be a device for executing a certain application provided by the server device 2000, and displaying information provided by the server device 2000, through an execution window of the certain application. The display device will be described in detail below with reference to FIG. 20. Each element of the control system according to an embodiment of the disclosure will now be described.

The air conditioner 1000 according to an embodiment of the disclosure may be a device for appropriately adjusting the temperature, humidity, quality, or flow of indoor air. The air conditioner 1000 may include a remote controller for controlling the air conditioner 1000. The air conditioner 1000 may obtain indoor environment information by using at least one sensor. For example, the air conditioner 1000 may include a temperature sensor, a humidity sensor, and a dust sensor. The air conditioner 1000 may measure a current indoor temperature by using the temperature sensor, measure a current indoor humidity by using the humidity sensor, and measure a current indoor dust value by using the dust sensor.

According to an embodiment of the disclosure, the air conditioner 1000 may include a communication interface for communicating with an external device. For example, the air conditioner 1000 may communicate with the server device 2000 through the communication interface. The communication interface may include a short-range wireless communication interface and a mobile communication interface. The short-range wireless communication interface may include a Bluetooth communication interface, a Bluetooth Low Energy (BLE) communication interface, a near field communication (NFC) interface, a wireless local area network (WLAN) (or Wi-Fi) communication interface, a Zigbee communication interface, an Infrared Data Association (IrDA) communication interface, a Wi-Fi Direct (WFD) communication interface, an ultra-wideband (UWB) communication interface, or an Ant+ communication interface, but is not limited thereto.

According to an embodiment of the disclosure, the air conditioner 1000 may upload the indoor environment information to the server device 2000 through the communication interface. The air conditioner 1000 may transmit the indoor environment information to the server device 2000 periodically or when a specific event occurs (e.g., when a request is received from the server device 2000). According to an embodiment of the disclosure, the air conditioner 1000 may transmit a current set temperature, a current fan speed, and device information (e.g., device performance and decrepitude), or an inquiry about settings of the air conditioner 1000 to the server device 2000 through the communication interface. The air conditioner 1000 may receive a request related to temperature adjustment or a request related to fan speed adjustment from the server device 2000 in response to the inquiry. For example, the air conditioner 1000 may receive a set temperature maintenance request, a set temperature reduction request, a set temperature increase request, a fan speed reduction request, a fan speed increase request, or a fan speed maintenance request from the server device 2000, but is not limited thereto. To prevent overcooling, a case when the air conditioner 1000 receives a set temperature increase request or a fan speed reduction request will be described below as a representative example.

According to an embodiment of the disclosure, when a request related to set temperature adjustment is received from the server device 2000, the air conditioner 1000 may adjust a set temperature. When a request related to fan speed adjustment is received from the server device 2000, the air conditioner 1000 may adjust a fan speed.

According to an embodiment of the disclosure, the air conditioner 1000 may be embedded with an AI processor. The AI processor may be produced in the form of a dedicated hardware chip for AI or as a part of a general-purpose processor (e.g., a central processing unit (CPU) or an application processor) or a dedicated graphics processor (e.g., a graphics processing unit (GPU)), and be embedded in the air conditioner 1000. The air conditioner 1000 may adjust the set temperature or the fan speed by using the AI processor. The air conditioner 1000 may recognize voice of the user 10 and execute a command corresponding to the voice of the user 10, by using the AI processor.

According to an embodiment of the disclosure, the air conditioner 1000 may receive an analog voice signal through a microphone, and convert the voice signal into computer-readable text by using an automatic speech recognition (ASR) model. The air conditioner 1000 may identify the intention of utterance of the user 10 by analyzing the converted text by using a natural language understanding (NLU) model. Herein, the ASR model or the NLU model may be an AI model. The AI model may be processed by a dedicated AI processor designed with a hardware structure specialized for processing AI models. The AI model may be made through training. For example, a basic AI model may be trained based on a plurality of pieces of training data by using a learning algorithm, and thus an AI model for performing a specific function may be made. The AI model may include a plurality of neural network layers. Each of the plurality of neural network layers has a plurality of weight values and performs neural network computation through computation between a computation result of a previous layer and the plurality of weight values.

Linguistic understanding is a technology for recognizing and applying/processing human languages/characters, and includes natural language processing, machine translation, dialog systems, question answering, speech recognition/synthesis, etc.

According to an embodiment of the disclosure, the air conditioner 1000 may obtain voice of the user 10 through the remote controller. When a voice signal of the user 10 is received through a microphone, the remote controller of the air conditioner 1000 may transmit the voice signal to the air conditioner 1000. According to another embodiment of the disclosure, when the ASR model or the NLU model is driven by the server device 2000, the remote controller of the air conditioner 1000 may transmit the voice signal to the server device 2000 and receive a voice recognition result from the server device 2000 through wireless communication (e.g., Wi-Fi). In this case, the remote controller of the air conditioner 1000 may transmit the voice recognition result to the air conditioner 1000.

According to an embodiment of the disclosure, the air conditioner 1000 may provide various operation modes. For example, the air conditioner 1000 may provide an AI comfort mode, a cool mode, a dry mode, a purify mode, and a wind-free mode, but is not limited thereto. The AI comfort mode may be a mode for automatically optimizing settings of the air conditioner 1000 by using AI models. The cool mode may be a basic operation mode for cooling. The dry mode may be an operation mode for drying indoor air by sucking in moisture in the air. The purify mode may be an operation mode for making indoor air fresh and clean by filtering yellow dust or fine dust floating in the air. A case when the air conditioner 1000 operates in the AI comfort mode will be described below as an example.

The server device 2000 according to an embodiment of the disclosure may include an AI processor. The AI processor may generate a first AI model 201 for inferring a temperature at which the user 10 feels comfortable, and a second AI model 202 for predicting an indoor temperature, by training an artificial neural network (ANN). When the ANN is 'trained', it may mean that a mathematical model for allowing connections of neurons in the ANN to make optimal decisions by appropriately changing weights based on data is generated. The server device 2000 may store the first and second AI models 201 and 202 in a memory. The server device 2000 may obtain a comfortable temperature graph of the user 10 from the first AI model 201, and obtain a predicted temperature graph from the second AI model 202. The comfortable temperature graph may refer to a set of temperatures at which the user 10 feels comfortable based on an operation time of the air conditioner 1000. The predicted temperature graph may refer to a set of temperatures predicted for future timings. The first and second AI models 201 and 202 will be described in detail below with reference to FIGS. 4 to 9.

According to an embodiment of the disclosure, the server device 2000 may be implemented as one server, two or more servers, or a cloud server. The server device 2000 may train the first and second AI models 201 and 202, or receive and store the first and second AI models 201 and 202 trained by an external server.

According to an embodiment of the disclosure, the server device 2000 may include a communication interface for communicating with an external device. For example, when the AI comfort mode is set, the server device 2000 may receive an inquiry about set temperature adjustment from the air conditioner 1000 and transmit a response to the inquiry to the air conditioner 1000. For example, when the user 10 comes indoors from outside and inputs 'Too hot. AI comfort mode' by voice through the remote controller of the air conditioner 1000, the air conditioner 1000 may start operating and set the operation mode to the AI comfort mode. In addition, the air conditioner 1000 may output a guidance message such as "You feel hot. Desired temperature is set to 18° C. for fast cooling and then will be adjusted before you feel cold" by voice or on a display in response to the user input. The air conditioner 1000 may inquire about set temperature adjustment by transmitting at least one of operation time information (e.g., an operation start timing), set temperature information (e.g., 18° C.), or current indoor temperature information (e.g., 30° C.) to the server device 2000 (operation S210). According to an embodiment of the disclosure, the air conditioner 1000 may repeatedly inquire of the server device 2000 about set temperature adjustment while the air conditioner 1000 is operating.

When the inquiry is received from the air conditioner 1000, the server device 2000 may predict whether overcooling will occur, by using the first and second AI models 201 and 202 (operation S220). For example, the server device 2000 may obtain a comfortable temperature graph of the user 10 from the first AI model 201, and obtain a predicted temperature graph from the second AI model 202 based on at least one of the operation time information of the air conditioner 1000 (e.g., a time from an operation start timing to a current timing), the set temperature information (e.g., 18° C.), or the current indoor temperature information (e.g., 30° C.). The server device 2000 may compare the comfortable temperature graph of the user 10 to the predicted temperature graph, and predict that overcooling will occur from a timing when the predicted temperature graph is reduced below the comfortable temperature graph of the user 10 (e.g., the timing i of FIG. 1). According to an embodiment of the disclosure, when it is predicted that overcooling will occur, the server device 2000 may predict changes in indoor temperature by applying one or more set temperatures to the second AI model 202 whenever the inquiry is received from the air conditioner 1000. The server device 2000 may determine an appropriate set temperature for preventing overcooling, based on the predicted changes in indoor temperature. When the server device 2000 determines the appropriate set temperature (e.g., 25° C.) by using the second AI model 202, the server device 2000 may transmit a set temperature increase request (e.g., a request instructing to increase from 18° C. to 25° C.) to the air conditioner 1000 (operation S230). The operation, performed by the server device 2000, of predicting whether overcooling will occur will be described in detail below with reference to FIG. 3.

The air conditioner 1000 may adjust the set temperature based on the set temperature increase request received from the server device 2000. For example, the air conditioner 1000 may change the set temperature from 18° C. to 25° C. at a timing when the set temperature increase request is received. According to an embodiment of the disclosure, the air conditioner 1000 may notify, by voice, that the set temperature has been adjusted. The air conditioner 1000 may change the set temperature output through the display, from 18° C. to 25° C.

Therefore, in the air conditioner control system according to an embodiment of the disclosure, the set temperature of the air conditioner 1000 may be appropriately adjusted using the first and second AI models 201 and 202 before the user 10 experiences discomfort due to overcooling. Furthermore, in the air conditioner control system according to an embodiment of the disclosure, wasted energy due to overcooling may be prevented and health problems due to overcooling (e.g., air-conditioning sickness) may also be prevented.

Meanwhile, according to another embodiment of the disclosure, the operation of the server device 2000 may be performed by the air conditioner 1000 or another indoor device (e.g., an air purifier, a refrigerator, a television (TV), a robot vacuum, or an AI speaker).

A method, performed by the air conditioner 1000, of controlling a set temperature to prevent overcooling while operating in an AI comfort mode will now be described in detail with reference to FIG. 3.

Figure 3:
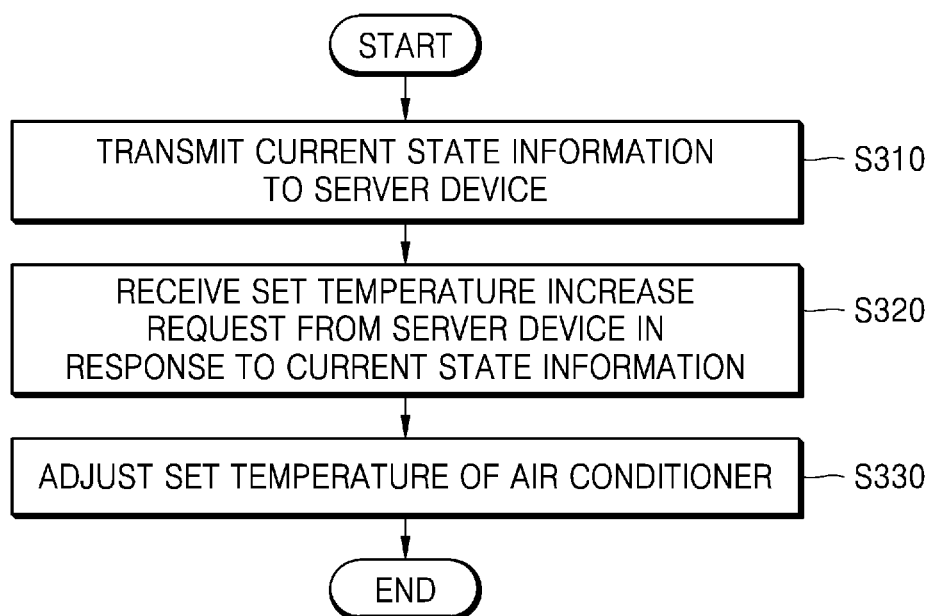
FIG. 3 is a flowchart of an operating method of an air conditioner, according to an embodiment of the disclosure.

FIG. 3 is a flowchart of an operating method of the air conditioner 1000, according to an embodiment of the disclosure.

In operation S310, the air conditioner 1000 according to an embodiment of the disclosure may transmit current state information to the server device 2000. In this case, the air conditioner 1000 may inquire of the server device 2000 about set temperature adjustment.

According to an embodiment of the disclosure, the current state information may include at least one of operation time information of the air conditioner 1000, set temperature information of the air conditioner 1000, or current indoor temperature information, but is not limited thereto. For example, the current state information may further include fan speed information, device performance information, and indoor humidity information.

The operation time information of the air conditioner 1000 may be information indicating a time elapsed from an operation start timing of the air conditioner 1000 to a current timing (e.g., 5 minutes, 10 minutes, or 20 minutes). The set temperature information of the air conditioner 1000 may be information about a desired temperature set in the air conditioner 1000 (e.g., 24° C.). The current indoor temperature information may include an indoor temperature value obtained using a temperature sensor of the air conditioner 1000 (e.g., 29° C.). The fan speed information may be information about a fan speed currently set in the air conditioner 1000 (e.g., Wind-free, Low, Medium, or High, or Level 0 (Wind-free), Level 1, Level 2, Level 3, Level 4, Level 5, or Max). The device performance information may be information about the performance of the air conditioner 1000, and may include, for example, hardware performance information and decrepitude information, but is not limited thereto. The indoor humidity information may include an indoor humidity value obtained using a humidity sensor of the air conditioner 1000 (e.g., 50%), but is not limited thereto.

The air conditioner 1000 according to an embodiment of the disclosure may repeatedly inquire about set temperature adjustment by transmitting the current state information to the server device 2000 while operating in an AI comfort mode. For example, the air conditioner 1000 may inquire of the server device 2000 about set temperature adjustment in a certain cycle or at a timing designated by the server device 2000.

In operation S320, the air conditioner 1000 according to an embodiment of the disclosure may receive a set temperature increase request from the server device 2000 in response to the current state information.

For example, when an overcooling period, in which a first predicted temperature graph obtained from the second AI model 202 based on the current state information is reduced below a comfortable temperature graph obtained from the first AI model 201, is identified, the air conditioner 1000 may receive the set temperature increase request from the server device 2000. According to an embodiment of the disclosure, the set temperature increase request may include a set temperature value. The set temperature increase request may include next inquiry timing information (e.g., after 5 minutes).

According to an embodiment of the disclosure, when the current state information is received from the air conditioner 1000, the server device 2000 may obtain the comfortable temperature graph from the first AI model 201 and obtain the first predicted temperature graph from the second AI model 202 based on the current state information. The server device 2000 may identify the overcooling period by comparing the comfortable temperature graph to the first predicted temperature graph.

According to an embodiment of the disclosure, the comfortable temperature graph may indicate a set of temperatures at which a user feels comfortable based on an operation time of the air conditioner 1000. The comfortable temperature graph may have a form of a solid line or a set of dots, but is not limited thereto.

According to an embodiment of the disclosure, the comfortable temperature graph may include an unstable period in which a comfortable temperature changes based on an operation time of the air conditioner 1000, and a stable period in which the comfortable temperature is constantly maintained. For example, although the user feels hot and thus feels comfortable at a low temperature before the air conditioner 1000 starts to operate, heat escapes from the body of the user over time after the air conditioner 1000 starts to operate, and thus the temperature at which the user feels comfortable is gradually increased. When a certain time has elapsed after the air conditioner 1000 starts to operate, the user body or an indoor temperature may enter a thermal equilibrium state and the temperature at which the user feels comfortable is constantly maintained at a specific temperature.

According to an embodiment of the disclosure, the comfortable temperature graph may be obtained from the first AI model 201 for inferring a comfortable temperature of the user. The first AI model 201 may be a model configured to infer a comfortable temperature through training based on user settings information (e.g., a set temperature at a first timing and an operation time from an operation start timing to the first timing), environment information (e.g., an indoor temperature, an outdoor temperature, an indoor humidity, an outdoor humidity, an indoor-outdoor temperature difference, and an indoor-outdoor humidity difference), and device information (e.g., fan speed information). The first AI model 201 will be described in detail below with reference to FIG. 4.

According to an embodiment of the disclosure, the server device 2000 may obtain the comfortable temperature graph by applying at least one of operation timing information of the air conditioner 1000, fan speed information of the air conditioner 1000, indoor humidity information, outdoor humidity information, outdoor temperature information, an indoor-outdoor humidity difference, or an indoor-outdoor temperature difference to the first AI model 201, but is not limited thereto. The operation timing information may be information about a time point or time period when the air conditioner 1000 is operating. For example, the operation timing information may include time period information such as morning, afternoon, evening, night, noon, or dawn, and time point information such as a specific time indicated by a clock.

For example, the server device 2000 may obtain a set of temperatures at which the user feels comfortable based on an operation time of the air conditioner 1000 under a first condition indicating a 'Low' fan speed of the air conditioner 1000, a time period of 'evening', and an indoor humidity of '60%', as the comfortable temperature graph by using the first AI model 201.

According to an embodiment of the disclosure, because a temperature at which the user feels comfortable varies depending on a time period, a fan speed, weather, or the like, the comfortable temperature graph obtained from the first AI model 201 may have various forms based on a time period, a fan speed, weather, an indoor humidity, an outdoor humidity, or the like.

According to an embodiment of the disclosure, the first predicted temperature graph may be obtained by applying, to the second AI model 202, the current state information received from the air conditioner 1000. The first predicted temperature graph may refer to a set of temperatures predicted based on the current state information. The first predicted temperature graph may have a form of a solid line or a set of dots, but is not limited thereto.

According to an embodiment of the disclosure, the first predicted temperature graph may be obtained by further inputting additional information to the second AI model 202 in addition to the current state information received from the air conditioner 1000. For example, the first predicted temperature graph may be obtained by further inputting at least one of operation timing information of the air conditioner 1000, indoor humidity information, outdoor temperature information, outdoor humidity information, weather information, performance information of the air conditioner 1000, or installation space information of the air conditioner 1000 to the second AI model 202. The performance information of the air conditioner 1000 may include hardware performance information, decrepitude information, and model information, but is not limited thereto. The installation space information of the air conditioner 1000 may include information about a thermal insulation level, information about whether a cooking appliance producing heat (e.g., a gas stove or an induction stove) is used, information about whether a lighting device producing heat is used, and information about whether windows are open or closed, but is not limited thereto.

According to an embodiment of the disclosure, the server device 2000 may obtain the additional information from an external server, home appliances, or a home network system. For example, the server device 2000 may obtain weather information, outdoor temperature information, and outdoor humidity information from a weather server. The server device 2000 may obtain indoor humidity information from an air purifier or a humidifier, and obtain, from a cooking appliance (e.g., a gas stove or an induction stove), information about whether the cooking appliance is used. The server device 2000 may obtain, from a home network system, information about whether a lighting device producing heat is used, and information about whether windows are open or closed.

The server device 2000 may compare the comfortable temperature graph obtained from the first AI model 201, to the first predicted temperature graph obtained from the second AI model 202 based on the current state information. The server device 2000 may identify that an overcooling period in which the first predicted temperature graph is reduced below the comfortable temperature graph will occur at a future timing, based on the comparison result.

When the overcooling period is identified, the server device 2000 may generate a set temperature increase request including information instructing to change the set temperature of the air conditioner 1000 to a first temperature. According to an embodiment of the disclosure, the first temperature may be determined from among one or more set temperatures, based on a result of comparing the comfortable temperature graph to one or more second predicted temperature graphs obtained by inputting the one or more set temperatures to the second AI model 202. Herein, the one or more set temperatures may be temperatures higher than a current set temperature of the air conditioner 1000.

For example, the server device 2000 may obtain the one or more second predicted temperature graphs by applying the one or more set temperatures to the second AI model 202. In this case, the server device 2000 may identify a second predicted temperature graph which is not reduced below the comfortable temperature graph and converges on the comfortable temperature graph, from among the one or more second predicted temperature graphs. The server device 2000 may determine a set temperature corresponding to the identified second predicted temperature graph, as the first temperature. For example, the server device 2000 may obtain a plurality of second predicted temperature graphs by individually applying set temperatures such as 23° C., 24° C., and 25° C. to the second AI model 202. In this case, when second-1 and second-2 predicted temperature graphs respectively corresponding to 23° C. and 24° C. exhibit an overcooling period reduced below the comfortable temperature graph, the server device 2000 may not select 23° C. and 24° C. as the set temperature. When a second-3 predicted temperature graph corresponding to 25° C. is not reduced below the comfortable temperature graph and converges on the comfortable temperature graph, the server device 2000 may determine 25° C. as the set temperature. The operation, performed by the server device 2000, of determining the set temperature will be described in detail below with reference to FIG. 11.

The server device 2000 may transmit, to the air conditioner 1000, the set temperature increase request instructing to change the set temperature to the first temperature (e.g., 25° C.). The server device 2000 may request the air conditioner 1000 to inquire about set temperature adjustment again after a certain time has elapsed.

In operation S330, the air conditioner 1000 according to an embodiment of the disclosure may adjust the set temperature of the air conditioner 1000 based on the set temperature increase request. For example, when the set temperature increase request includes information instructing to change the set temperature (or desired temperature) to the first temperature (e.g., 25° C.), the air conditioner 1000 may adjust the set temperature to the first temperature (e.g., 25° C.).

Meanwhile, the air conditioner 1000 may receive a request instructing to inquire about set temperature adjustment again after a certain time has elapsed, from the server device 2000 together with the set temperature increase request. In this case, when the certain time designated by the server device 2000 has elapsed, the air conditioner 1000 may inquire about set temperature adjustment again by transmitting the current state information to the server device 2000.

According to an embodiment of the disclosure, the air conditioner 1000 may control the set temperature by using the first and second AI models 201 and 202 driven by the server device 2000, in such a manner that the user always feels comfortable without feeling cold.

The first AI model 201 for inferring a comfortable temperature of a user will now be described in more detail with reference to FIG. 4.

Figure 4:
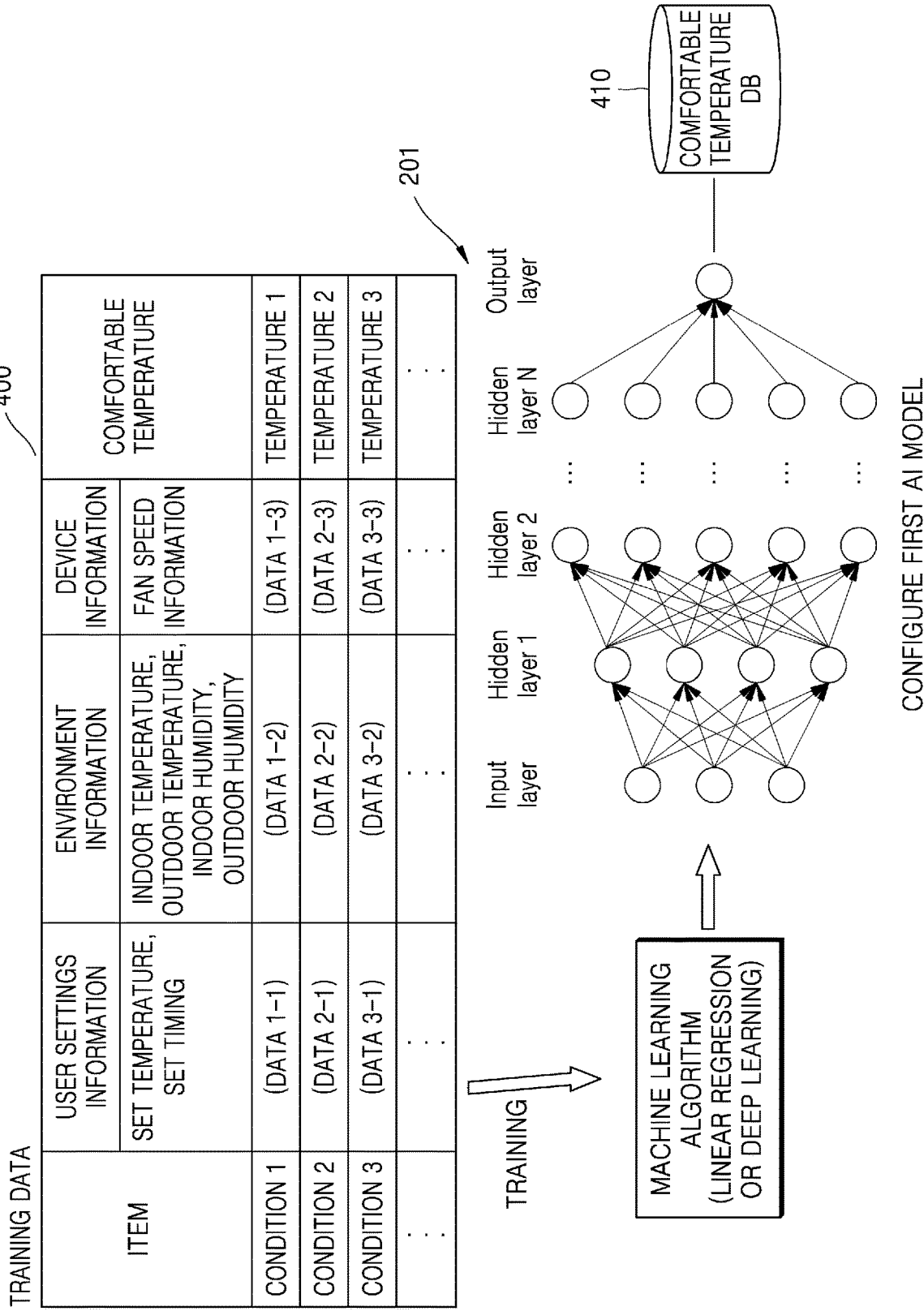
FIG. 4 is a diagram for describing an operation of training a first artificial intelligence (AI) model, according to an embodiment of the disclosure.

FIG. 4 is a diagram for describing an operation of training the first AI model 201, according to an embodiment of the disclosure.

According to an embodiment of the disclosure, an AI processor included in the server device 2000 may generate a comfortable temperature inference model by training an ANN. Herein, the comfortable temperature inference model may be the first AI model 201. When the ANN is 'trained', it may mean that a mathematical model for allowing connections of neurons in the ANN to make optimal decisions by appropriately changing weights based on training data 400 is generated. For example, the AI processor may configure the first AI model 201 for inferring the comfortable temperature, by obtaining the training data 400 and training a basic machine learning algorithm by using the training data 400.

According to an embodiment of the disclosure, the training data 400 may include condition information and comfortable temperature information. The condition information may include user settings information (e.g., a desired temperature set by a user and a timing when the user sets the desired temperature), environment information (e.g., an indoor temperature, an indoor humidity, an outdoor temperature, an outdoor humidity, an indoor-outdoor humidity difference, an indoor-outdoor temperature difference, and weather), and device information (e.g., a fan speed currently set in the air conditioner 1000), but is not limited thereto. For example, the condition information may further include time period information (e.g., morning, afternoon, evening, or dawn), season information, and activity information of the user (e.g., information about whether the user is exercising or cooking). The comfortable temperature information may include a temperature at which the user feels comfortable under each condition. For example, when the user changes the desired temperature from 18° C. to 25° C. at a first timing when 20 minutes have elapsed after the air conditioner 1000 starts to operate, when a fan speed at the first timing is 'Low', and when an indoor temperature is 20° C., it means that the user feels cold at 20° C. at the first timing, and thus 22° C. obtained by adding 2° C. to the indoor temperature may serve as the comfortable temperature of the first timing. Therefore, the training data 400 in this case may include {Set timing: 20 minutes after starting operation, Set temperature: 25° C., Current indoor temperature: 20° C., Current indoor humidity: 60%, Fan speed: Low, Comfortable temperature: 22° C.}.

According to an embodiment of the disclosure, the training data 400 may be obtained from the air conditioner 1000, an external server, or at least one home appliance. For example, the server device 2000 may obtain user settings information, fan speed information, indoor temperature information, and indoor humidity information from the air conditioner 1000. The server device 2000 may obtain weather information, outdoor humidity information, and outdoor temperature information from the external server (e.g., a weather server). The server device 2000 may obtain indoor temperature information and indoor humidity information from a humidifier or an air purifier. The server device 2000 may obtain, from a robot vacuum, an image including an activity of the user. The server device 2000 may obtain exercise information of the user from an exercise machine and obtain, from a cooking appliance, information about whether the user is cooking.

According to an embodiment of the disclosure, the basic machine learning algorithm may be a linear regression algorithm or a deep learning algorithm, but is not limited thereto. The linear regression algorithm may model a linear correlation between a dependent variable y and one or more independent variables (or explanatory variables) X. The deep learning algorithm is a machine learning algorithm that attempts high-level abstraction (i.e., summarizing key contents or functions in large amounts of data or complex data) through a combination of several nonlinear transformation methods.

According to an embodiment of the disclosure, the first AI model 201 may be trained using the training data 400 to generate a comfortable temperature database (DB) 410. According to an embodiment of the disclosure, the first AI model 201 may update the comfortable temperature DB 410 when the training data 400 is added or updated. According to an embodiment of the disclosure, the comfortable temperature DB 410 may be a DB storing comfortable temperature graphs of the user under various conditions, and include a table in which the condition information is mapped to the comfortable temperature graphs of the user. The condition information may include time information (e.g., operation timing information of the air conditioner 1000), environment information (e.g., an indoor humidity, an outdoor humidity, an indoor temperature, an outdoor temperature, an indoor-outdoor humidity difference, an indoor-outdoor temperature difference, and weather), and device information (e.g., fan speed information and performance information), but is not limited thereto.

According to an embodiment of the disclosure, the comfortable temperature DB 410 may be generated while the first AI model 201 is being trained or after the first AI model 201 is trained, but is not limited thereto.

According to an embodiment of the disclosure, the comfortable temperature DB 410 may store various comfortable temperature graphs under various conditions. The various comfortable temperature graphs will be described in detail below with reference to FIGS. 7A and 7B.

Meanwhile, according to an embodiment of the disclosure, the first AI model 201 may be configured to generate a comfortable temperature graph including an unstable period and a stable period. An operation, performed by the first AI model 201, of modeling an unstable period will now be described with reference to FIG. 5, and then an operation, performed by the first AI model 201, of modeling a stable period will be described with reference to FIG. 6.

Figure 5:
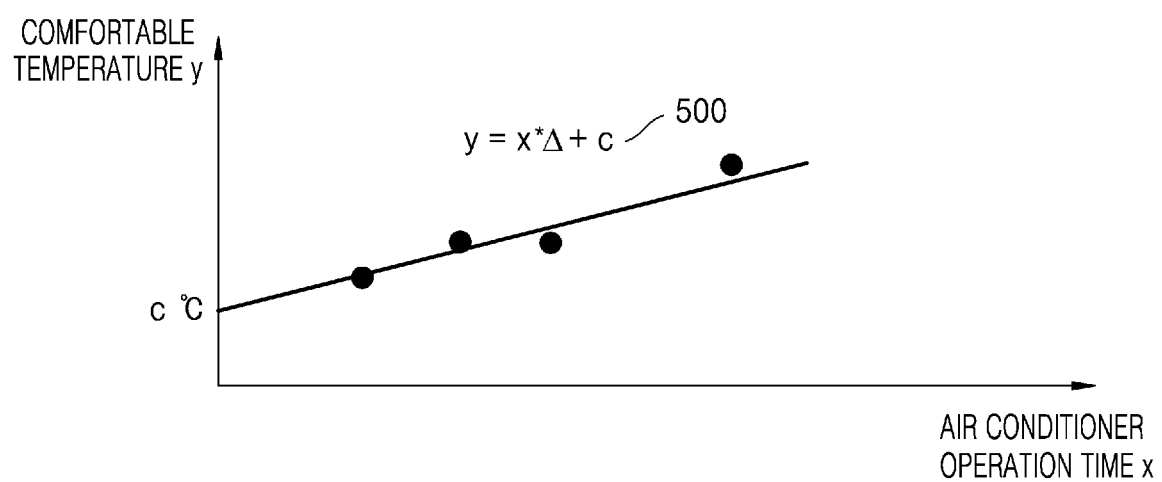
FIG. 5 is a diagram for describing an operation of modeling an unstable period of a comfortable temperature graph, according to an embodiment of the disclosure.

FIG. 5 is a diagram for describing an operation of modeling an unstable period of a comfortable temperature graph, according to an embodiment of the disclosure.

Referring to FIG. 5, an AI processor may model a comfortable temperature of an unstable period of a comfortable temperature graph by using a linear regression algorithm (also referred to as a linear regression AI model). For example, when a user increases a set temperature of the air conditioner 1000 at a first timing, the AI processor may define "Indoor temperature at first timing +1° C. or +2° C.)" as a comfortable temperature of the first timing. The AI processor may store the comfortable temperature of the first timing and an operation time of the air conditioner 1000 at the first timing as first training data. When two or more comfortable temperatures are stored as training data, the linear regression algorithm (or linear regression AI model)

may be trained based on the training data to infer a comfortable temperature of the air conditioner 1000 based on an operation time.

For example, the linear regression algorithm (or linear regression AI model) may estimate c and Δ by finding a linear equation which is closest to all points. That is, the linear regression algorithm (or linear regression AI model) may obtain a linear equation 500 of Comfortable temperature y=x*Δ+c. Meanwhile, although the first AI model 201 is described as a linear regression AI model in FIG. 5, but is not limited thereto and may be a non-linear AI model.

Figure 6:
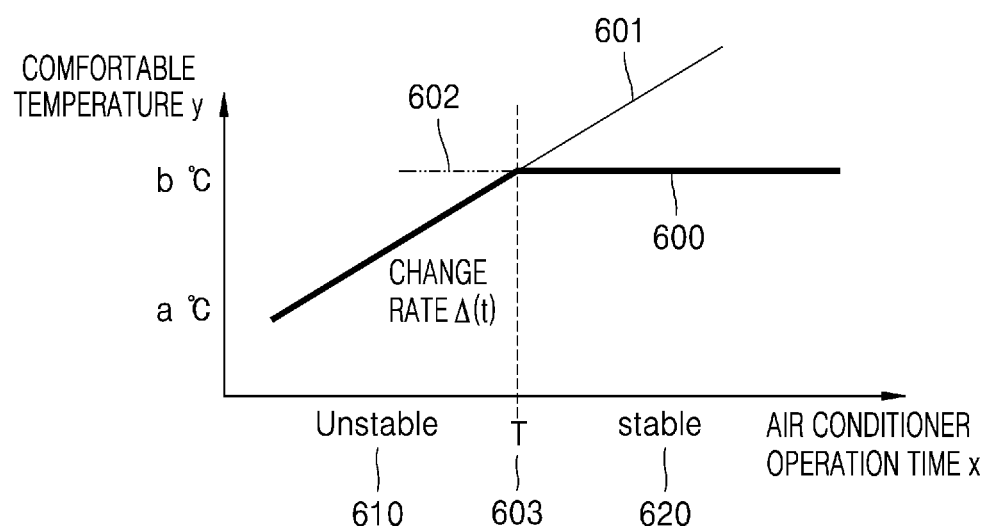
FIG. 6 is a diagram for describing an unstable period and a stable period of a comfortable temperature graph, according to an embodiment of the disclosure.

FIG. 6 is a diagram for describing an unstable period and a stable period of a comfortable temperature graph, according to an embodiment of the disclosure.

The first AI model 201 may determine whether a comfortable temperature enters a stable state through thermal equilibrium of the body of a user or an indoor space. The stable state refers to a state in which the comfortable temperature does not change and is constantly maintained based on an operation time of the air conditioner 1000. For example, the first AI model 201 may be trained based on training data to determine that the comfortable temperature enters the stable state, when a certain time (e.g., 30 minutes) has elapsed after the air conditioner 1000 starts to operate, when a set temperature of the air conditioner 1000 does not change during a certain time h, and when an indoor temperature is maintained in a certain range. In this case, the first AI model 201 may define the indoor temperature during the certain time h as the comfortable temperature of the stable period.

Referring to FIG. 6, the first AI model 201 may identify a coordinate (T, b) at which a first graph 601 corresponding to the linear equation 500 of FIG. 5 meets a second graph 602 obtained by connecting indoor temperatures during the certain time h. The first AI model 201 may generate a comfortable temperature graph 600 to follow the first graph 601 before a timing T 603 and follow the second graph 602 after the timing T 603. For example, the first AI model 201 may obtain, as an output value, the comfortable temperature graph 600 including an unstable period 610 in which comfortable temperature changes based on an operation time of the air conditioner 1000 before the timing T 603, and a stable period 620 in which the comfortable temperature is constantly maintained after the timing T 603.

In general, although it is very hot, when about 30 minutes have elapsed after the air conditioner 1000 is turned on, it enters a stable state through thermal equilibrium. Therefore, when the air conditioner 1000 is turned on, a pattern like the comfortable temperature graph 600 of FIG. 6 may always exist.

Figure 7A:
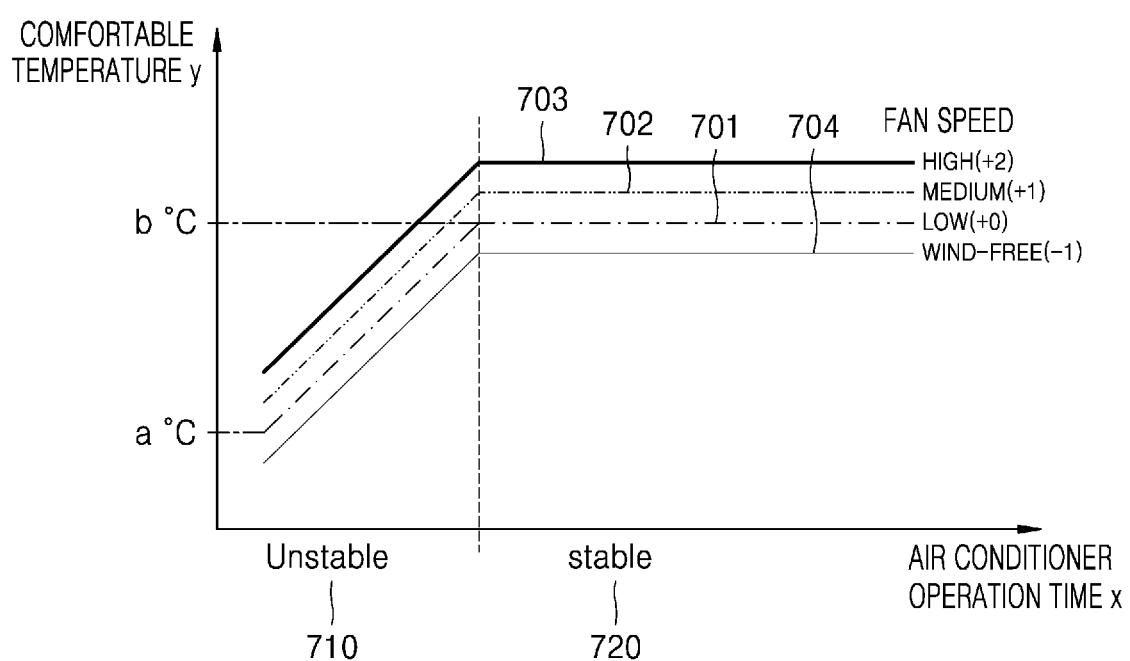
FIG. 7A is a diagram for describing a plurality of comfortable temperature graphs obtained by applying a plurality of fan speed values to a first AI model, according to an embodiment of the disclosure.

FIG. 7A is a diagram for describing a plurality of comfortable temperature graphs obtained by applying a plurality of fan speed values to the first AI model 201, according to an embodiment of the disclosure.

Referring to FIG. 7A, the first AI model 201 may generate various comfortable temperature graphs based on fan speed values of the air conditioner 1000. For example, when a fan speed is 'Low', the first AI model 201 may obtain a first comfortable temperature graph 701 in which a comfortable temperature is increased from a ° C. to b ° C. in an unstable period 710 and is maintained at b ° C. in a stable period 720.

When the fan speed is 'Medium', the first AI model 201 may obtain a second comfortable temperature graph 702 in which the comfortable temperature is increased from a+1° C. to b+1° C. in the unstable period 710 and is maintained at b+1° C. in the stable period 720. When the fan speed is 'High', the first AI model 201 may obtain a third comfortable temperature graph 703 in which the comfortable temperature is increased from a+2° C. to b+2° C. in the unstable period 710 and is maintained at b+2° C. in the stable period 720. When the fan speed is 'Wind-free', the first AI model 201 may obtain a fourth comfortable temperature graph 704 in which the comfortable temperature is increased from a−1° C. to b−1° C. in the unstable period 710 and is maintained at b−1° C. in the stable period 720.

According to an embodiment of the disclosure, the comfortable temperature is increased when the fan speed of the air conditioner 1000 is increased, and is reduced when the fan speed is reduced. According to an embodiment of the disclosure, the first to fourth comfortable temperature graphs 701 to 704 may be stored in the comfortable temperature DB 410.

Figure 7B:
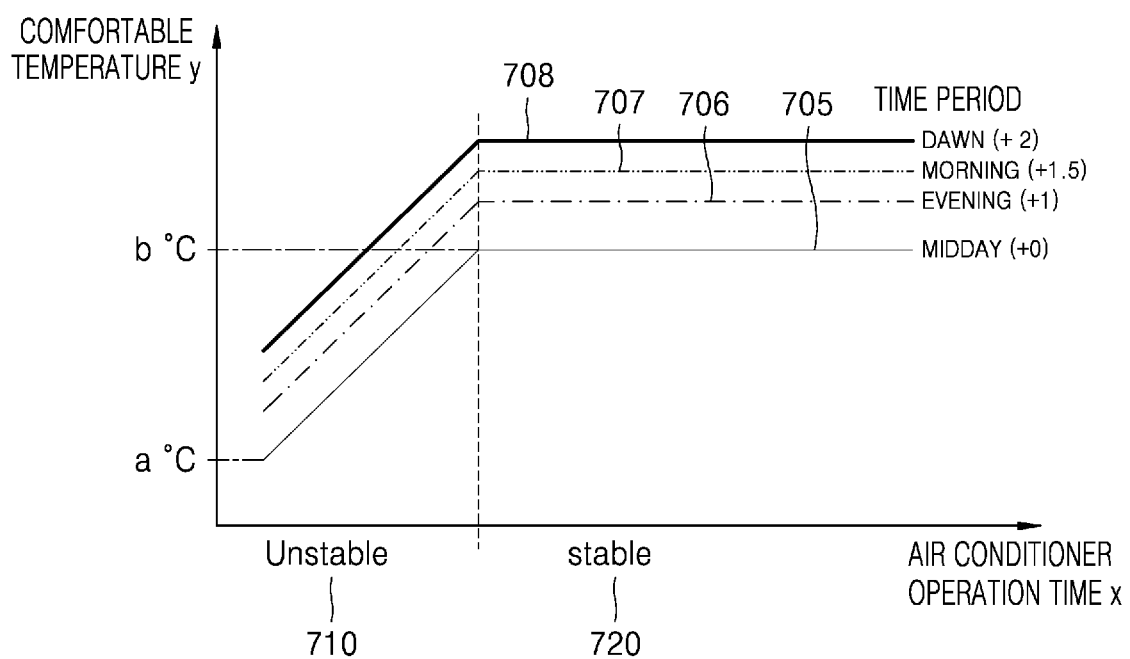
FIG. 7B is a diagram for describing a plurality of comfortable temperature graphs obtained by applying a plurality of time periods to a first AI model, according to an embodiment of the disclosure.

FIG. 7B is a diagram for describing a plurality of comfortable temperature graphs obtained by applying a plurality of time periods to the first AI model 201, according to an embodiment of the disclosure.

Referring to FIG. 7B, the first AI model 201 may generate various comfortable temperature graphs based on a time point (or time period) when the air conditioner 1000 operates. For example, when the air conditioner 1000 operates around midday, the first AI model 201 may obtain a fifth comfortable temperature graph 705 in which a comfortable temperature is increased from a ° C. to b ° C. in the unstable period 710 and is maintained at b ° C. in the stable period 720.

When the air conditioner 1000 operates in the evening, the first AI model 201 may obtain a sixth comfortable temperature graph 706 in which the comfortable temperature is increased from a+1° C. to b+1° C. in the unstable period 710 and is maintained at b+1° C. in the stable period 720. When the air conditioner 1000 operates in the morning, the first AI model 201 may obtain a seventh comfortable temperature graph 707 in which the comfortable temperature is increased from a+1.5° C. to b+1.5° C. in the unstable period 710 and is maintained at b+1.5° C. in the stable period 720. When the air conditioner 1000 operates at dawn, the first AI model 201 may obtain an eighth comfortable temperature graph 708 in which the comfortable temperature is increased from a+2° C. to b+2° C. in the unstable period 710 and is maintained at b+2° C. in the stable period 720.

According to an embodiment of the disclosure, the comfortable temperature may be reduced when the air conditioner 1000 operates around midday, but be increased when the air conditioner 1000 operates in the morning or at dawn. According to an embodiment of the disclosure, the fifth to eighth comfortable temperature graphs 705 to 708 may be stored in the comfortable temperature DB 410.

Meanwhile, according to an embodiment of the disclosure, the comfortable temperature graph may also vary depending on activity information of a user. For example, the comfortable temperature may be reduced when the user is exercising or has just finished exercising, and be increased when the user reads a book on a desk or watches TV on a sofa. According to an embodiment of the disclosure, the comfortable temperature DB 410 may store various comfortable temperature graphs based on the activity information of the user.

Figure 8:
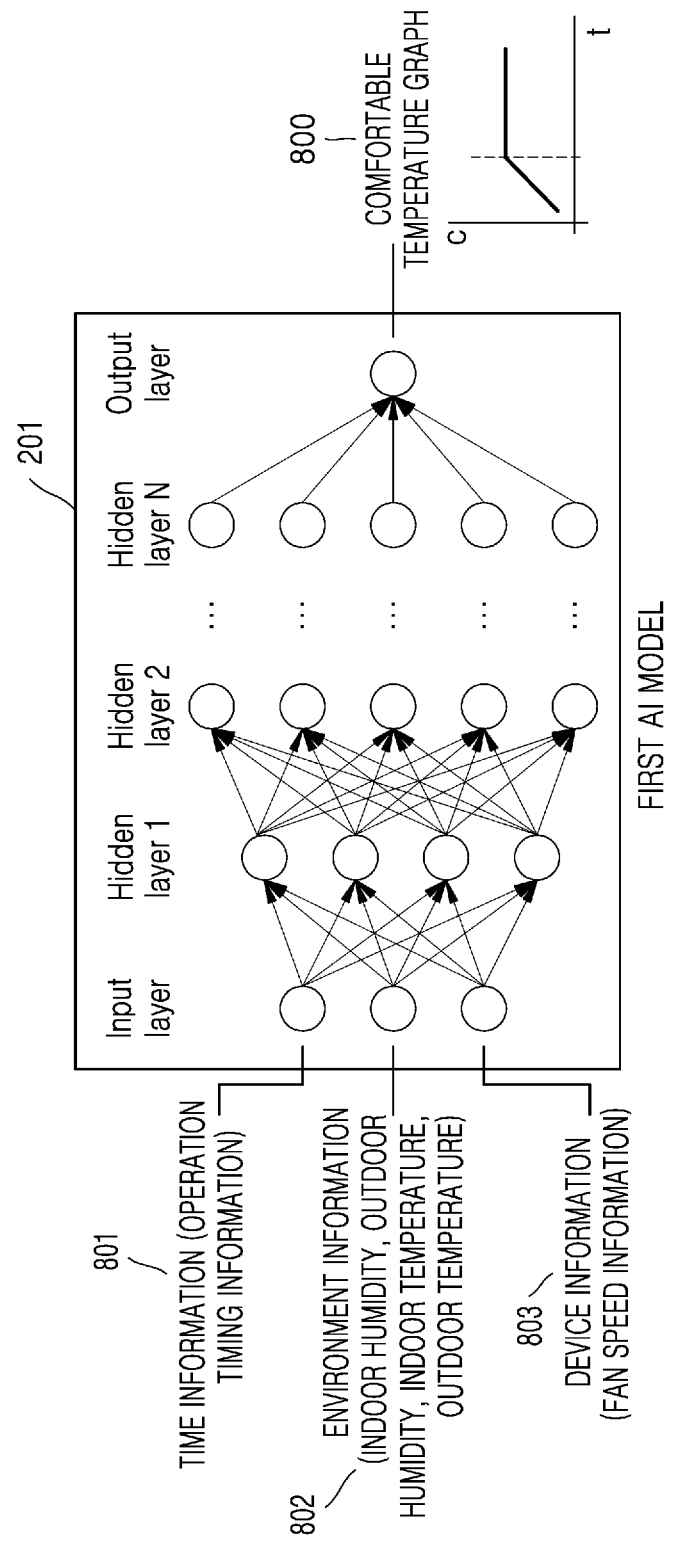
FIG. 8 is a diagram for describing an operation of obtaining a comfortable temperature graph from a first AI model, according to an embodiment of the disclosure.

FIG. 8 is a diagram for describing an operation of obtaining a comfortable temperature graph from the first AI model 201, according to an embodiment of the disclosure.

Referring to FIG. 8, according to an embodiment of the disclosure, the server device 2000 may obtain a comfortable temperature graph 800 by applying at least one of time information 801, environment information 802, or device information 803 to the first AI model 201, but is not limited thereto. The time information 801 may include operation timing information of the air conditioner 1000 (e.g., an operation time point or time period). The environment information 802 may include an indoor humidity, an outdoor humidity, an indoor temperature, an outdoor temperature, an indoor-outdoor temperature difference, an indoor-outdoor humidity difference, and weather. The device information 803 may include fan speed information, device performance information, and device decrepitude information.

According to an embodiment of the disclosure, the server device 2000 may obtain the comfortable temperature graph 800 as an output value of the first AI model 201. For example, the first AI model 201 may generate the comfortable temperature graph 800 as the output value based on the time information 801, the environment information 802, and the device information 803. The first AI model 201 may transmit the comfortable temperature graph 800 to a processor of the server device 2000. According to an embodiment of the disclosure, the first AI model 201 may extract the comfortable temperature graph 800 from the comfortable temperature DB 410, based on the time information 801, the environment information 802, and the device information 803. In this case, the comfortable temperature graph 800 may include an unstable period in which a comfortable temperature is increased based on an operation time of the air conditioner 1000, and a stable period in which the comfortable temperature is constantly maintained.

According to an embodiment of the disclosure, the first AI model 201 may obtain the comfortable temperature graph 800 as the output value by further applying context information of a user. For example, when the server device 2000 collects the context information of the user (e.g., "Back home after run") from a mobile device (e.g., a wearable device) of the user, the first AI model 201 may output the comfortable temperature graph 800 to which the context information of the user is reflected. When the user comes back home after run, the comfortable temperature graph 800 may be generated to be lower than that of a general case.

When the server device 2000 collects, from a cooking appliance (e.g., an induction stove), information indicating that the user is using the cooking appliance, the first AI model 201 may output the comfortable temperature graph 800 to which context information indicating that the user is cooking is reflected.

Figure 9:
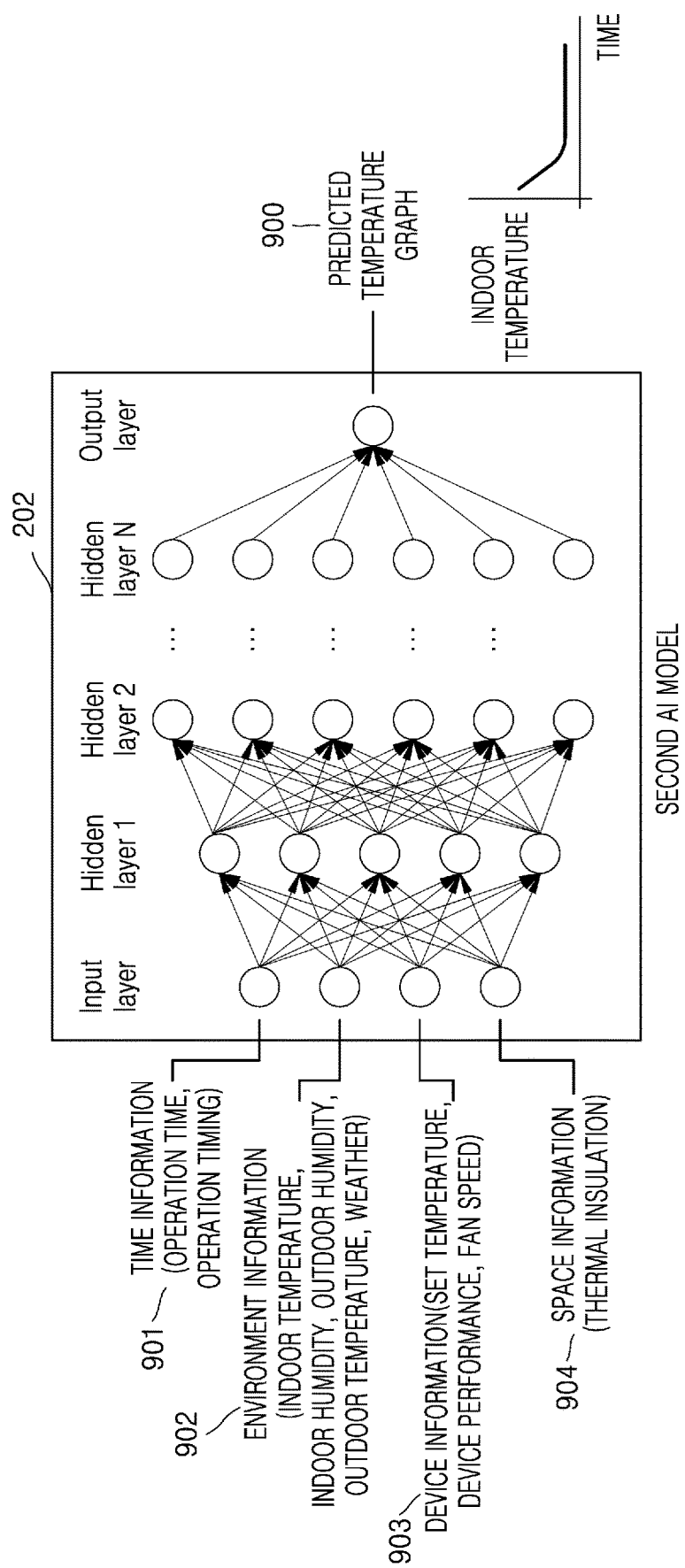
FIG. 9 is a diagram for describing an operation of obtaining a predicted temperature graph from a second AI model, according to an embodiment of the disclosure.

FIG. 9 is a diagram for describing an operation of obtaining a predicted temperature graph from the second AI model 202, according to an embodiment of the disclosure.

According to an embodiment of the disclosure, an AI processor included in the server device 2000 may generate an indoor temperature prediction model by training an ANN. Herein, the indoor temperature prediction model may be the second AI model 202. When the ANN is 'trained', it may mean that a mathematical model for allowing connections of neurons in the ANN to make optimal decisions by appropriately changing weights based on training data is generated. Herein, the ANN may include at least one of a deep neural network (DNN), a recurrent neural network (RNN), a convolutional neural network (CNN), a restricted Boltzmann machine (RBM), a deep belief network (DBN), a bidirectional recurrent deep neural network (BRDNN), or a deep Q-network (DQN), but is not limited thereto.

For example, the AI processor may configure the second AI model 202 for predicting indoor temperatures of future timings, by obtaining training data and training an ANN model by using the training data. According to an embodiment of the disclosure, the training data may include user settings information (e.g., a desired temperature set by a user and a timing when the user sets the desired temperature), environment information (e.g., an indoor temperature, an indoor humidity, an outdoor temperature, an outdoor humidity, an indoor-outdoor humidity difference, an indoor-outdoor temperature difference, and weather), device information (e.g., a fan speed currently set in the air conditioner 1000, and device performance), and space information (e.g., thermal insulation information, information about whether a lighting device is used, and information about whether windows are open or closed). For example, the user may change the desired temperature from 18° C. to 25° C. at a first timing when 20 minutes have elapsed after the air conditioner 1000 starts to operate, a fan speed at the first timing may be 'Low', and an indoor temperature at the first timing may be 20° C. An indoor temperature at a second timing when 5 minutes have elapsed from the first timing may be 21° C., and an indoor temperature at a third timing when 10 minutes have elapsed from the first timing may be 22° C. In this case, the training data may include {Set timing: First timing (20 minutes after starting operation), Set temperature at first timing: 25° C., Fan speed at first timing: Low, Indoor temperature at first timing: 20° C., Indoor temperature at second timing: 21° C., Indoor temperature at third timing: 22° C.}. The accuracy of temperature values predicted by the second AI model 202 may be increased when the second AI model 202 is trained based on various types of training data.

Referring to FIG. 9, the server device 2000 may obtain a predicted temperature graph 900 by applying time information 901, environment information 902, device information 903, and space information 904 to the second AI model 202. According to an embodiment of the disclosure, not all of the time information 901, the environment information 902, the device information 903, and the space information 904 may be applied to the second AI model 202, and only some of them may be applied. The time information 901 may include operation time information of the air conditioner 1000, and operation timing information of the air conditioner 1000 (e.g., an operation time point or time period). The environment information 902 may include an indoor humidity, an outdoor humidity, an indoor temperature, an outdoor temperature, an indoor-outdoor temperature difference, an indoor-outdoor humidity difference, and weather. The device information 903 may include fan speed information set in the air conditioner 1000, set temperature information of the air conditioner 1000, device performance information, and device decrepitude information, but is not limited thereto. The space information 904 may include information about a thermal insulation level, information about whether a cooking appliance producing heat (e.g., a gas stove or an induction stove) is used, information about whether a lighting device producing heat is used, and information about whether windows are open or closed, but is not limited thereto.

According to an embodiment of the disclosure, the server device 2000 may obtain the predicted temperature graph 900 as an output value of the second AI model 202. For example, when a current indoor temperature is 30° C., and when a current set temperature of the air conditioner 1000 is 18° C., the second AI model 202 may generate, as the output value, the predicted temperature graph 900 in which the temperature is reduced from 30° C. to 18° C. over time.

According to an embodiment of the disclosure, the predicted temperature graph 900 may be generated in various forms based on a set temperature of the air conditioner 1000, a fan speed, an operation time of the air conditioner 1000, and a current indoor temperature. For example, when the fan speed is High, compared to a case when the fan speed is Low, a temperature may be reduced rapidly.

An operation, performed by the server device 2000, of identifying whether overcooling will occur, based on a comfortable temperature graph obtained from the first AI model 201 and a predicted temperature graph obtained from the second AI model 202 will now be described in detail with reference to FIG. 10.

Figure 10:
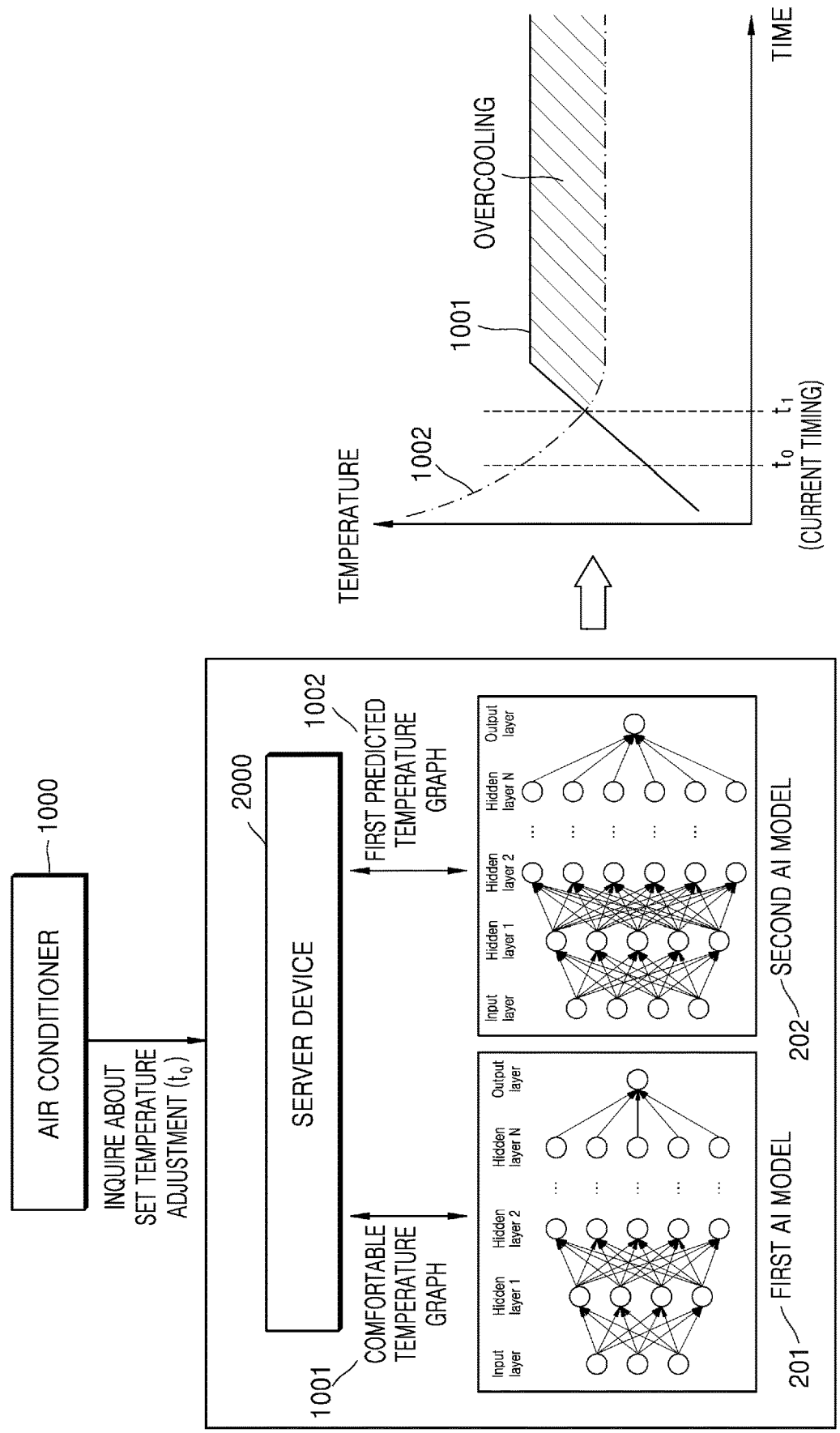
FIG. 10 is a diagram for describing an operation, performed by a server device, of identifying an overcooling period, according to an embodiment of the disclosure.

FIG. 10 is a diagram for describing an operation, performed by the server device 2000, of identifying an overcooling period, according to an embodiment of the disclosure.

According to an embodiment of the disclosure, the air conditioner 1000 may inquire of the server device 2000 about set temperature adjustment at a timing $t_0$. In this case, the air conditioner 1000 may transmit, to the server device 2000, current state information including a set temperature at the timing $t_0$ (e.g., 18° C.), an operation time until the timing $t_0$ (e.g., 6 minutes), and an indoor temperature at the timing $t_0$ (e.g., 27° C.).

When the set temperature adjustment inquiry is received from the air conditioner 1000, the server device 2000 may obtain a comfortable temperature graph 1001 from the first AI model 201, and obtain a first predicted temperature graph 1002 from the second AI model 202. For example, the server device 2000 may obtain the comfortable temperature graph 1001 by applying at least one of time information (e.g., the timing $t_0$=midday), environment information (e.g., an indoor temperature at the timing $t_0$, an indoor humidity at the timing $t_0$, weather at the timing $t_0$, an outdoor temperature at the timing $t_0$, and an outdoor humidity at the timing $t_0$), or device information (e.g., a fan speed at the timing $t_0$) to the first AI model 201, but is not limited thereto. The comfortable temperature graph 1001 may include an unstable period and a stable period. The operation, performed by the server device 2000, of obtaining the comfortable temperature graph 1001 is described above in relation to FIG. 8, and thus a detailed description thereof is not provided herein.

The server device 2000 may obtain the first predicted temperature graph 1002 by applying, to the second AI model 202, the current state information received from the air conditioner 1000. For example, the server device 2000 may obtain the first predicted temperature graph 1002 by applying the set temperature at the timing $t_0$ (e.g., 18° C.), the operation time until the timing $t_0$ (e.g., 6 minutes), and the indoor temperature at the timing $t_0$ (e.g., 27° C.) to the second AI model 202. Because the current indoor temperature is 27° C. and the current set temperature of the air conditioner 1000 is 18° C., the second AI model 202 may generate, as an output value, the first predicted temperature graph 1002 in which the temperature is reduced from 27° C. to 18° C. over time. The operation, performed by the server device 2000, of obtaining the first predicted temperature graph 1002 is described above in relation to FIG. 9, and thus a detailed description thereof is not provided herein.

According to an embodiment of the disclosure, the server device 2000 may identify an overcooling period by comparing the comfortable temperature graph 1001 to the first predicted temperature graph 1002. For example, because the comfortable temperature graph 1001 is reduced below the first predicted temperature graph 1002 at a timing $t_1$, the server device 2000 may predict that overcooling will occur from the timing $t_1$.

According to an embodiment of the disclosure, when it is predicted that overcooling will occur, the server device 2000 may increase the set temperature of the air conditioner 1000 to a specific temperature to prevent overcooling. The operation, performed by the server device 2000, of adjusting the set temperature of the air conditioner 1000 to the specific temperature will now be described in detail with reference to FIG. 11.

Figure 11:
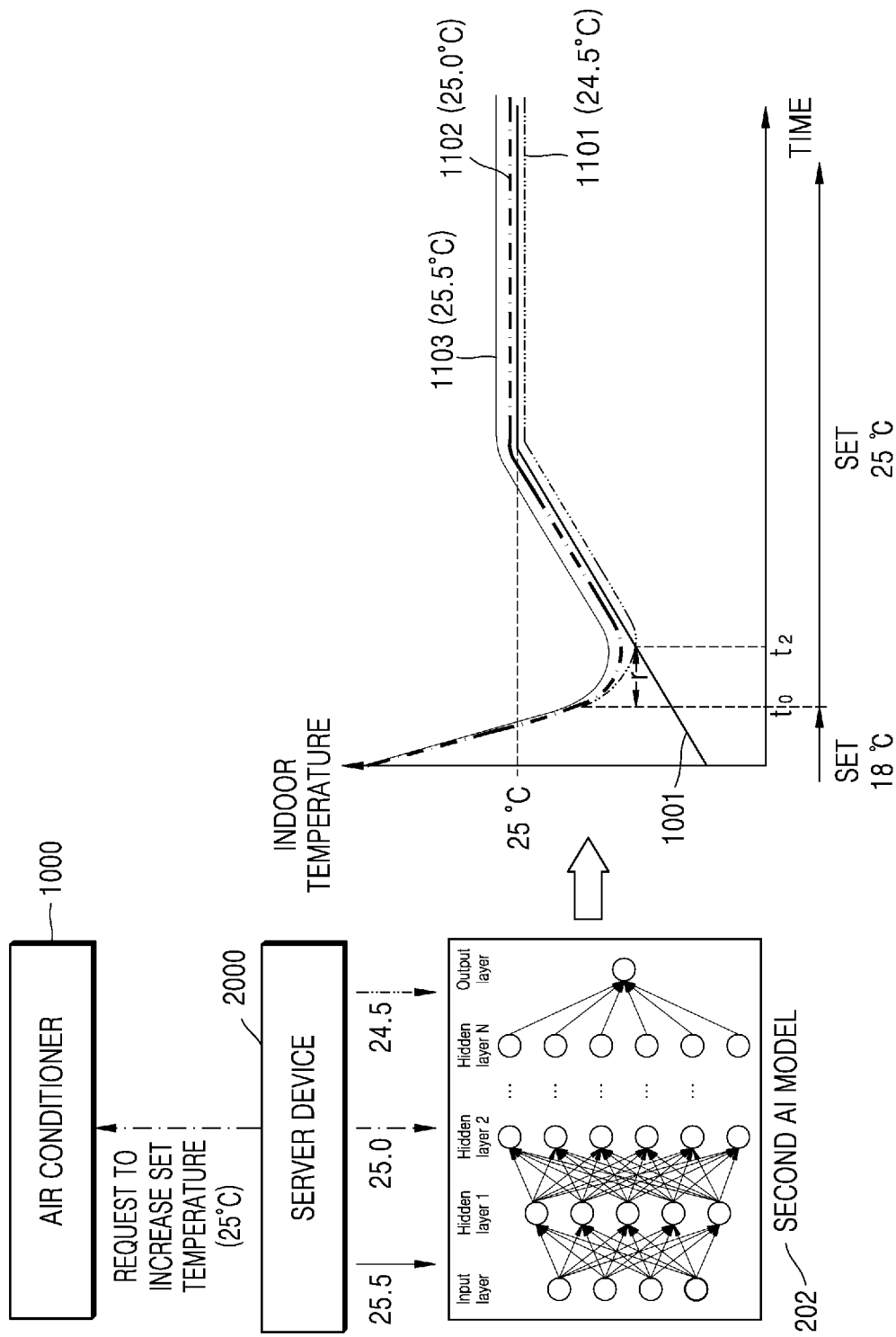
FIG. 11 is a diagram for describing an operation, performed by a server device, of determining a set temperature of an air conditioner by using a second AI model, according to an embodiment of the disclosure.

FIG. 11 is a diagram for describing an operation, performed by the server device 2000, of determining a set temperature of the air conditioner 1000 by using the second AI model 202, according to an embodiment of the disclosure.

Referring to FIG. 11, to prevent overcooling, the server device 2000 may apply a plurality of set temperatures to the second AI model 202 at a timing $t_0$. For example, the server device 2000 may apply 24.5° C., 25° C., and 25.5° C. to the second AI model 202. In this case, the server device 2000 may obtain, from the second AI model 202, a predicted temperature graph corresponding to each set temperature. Even when the set temperature is changed at the timing $t_0$, an indoor temperature is not immediately increased due to thermal inertia. Therefore, the predicted temperature graph corresponding to each set temperature may have a pattern in which the indoor temperature is reduced during a certain time (e.g., r) from the timing $t_0$ and then is increased after the certain time (e.g., r) has elapsed.

The server device 2000 may obtain a second-1 predicted temperature graph 1101 corresponding to the set temperature of 24.5° C., a second-2 predicted temperature graph 1102 corresponding to the set temperature of 25.0° C., and a second-3 predicted temperature graph 1103 corresponding to the set temperature of 25.5° C. In this case, the second-1 predicted temperature graph 1101 corresponding to the set temperature of 24.5° C. shows an overcooling period in which a predicted indoor temperature is reduced below a comfortable temperature from a timing $t_2$, and thus the server device 2000 may not select 24.5° C. as the set temperature of the air conditioner 1000. When the second-2 predicted temperature graph 1102 corresponding to the set temperature of 25.0° C. is compared to the second-3 predicted temperature graph 1103 corresponding to the set temperature of 25.5° C., the second-2 predicted temperature graph 1102 is closest to the comfortable temperature graph 1001. That is, the second-2 predicted temperature graph 1102 may not be reduced below the comfortable temperature graph 1001 and converge on the comfortable temperature graph 1001. Therefore, the server device 2000 may select 25.0° C. as the set temperature of the air conditioner 1000.

Because the set temperature of the air conditioner 1000 is determined as 25.0° C. by using the second AI model 202, the server device 2000 may transmit, to the air conditioner 1000, a set temperature increase request instructing to change the set temperature to 25° C. The air conditioner 1000 may change the set temperature from 18° C. to 25° C. based on the set temperature increase request. In this case, because the predicted indoor temperature is not reduced below the comfortable temperature, a user may not experience discomfort due to overcooling. The method, performed by the server device 2000, of adjusting the set temperature of the air conditioner 1000 will now be described in more detail with reference to FIG. 12.

Figure 12:
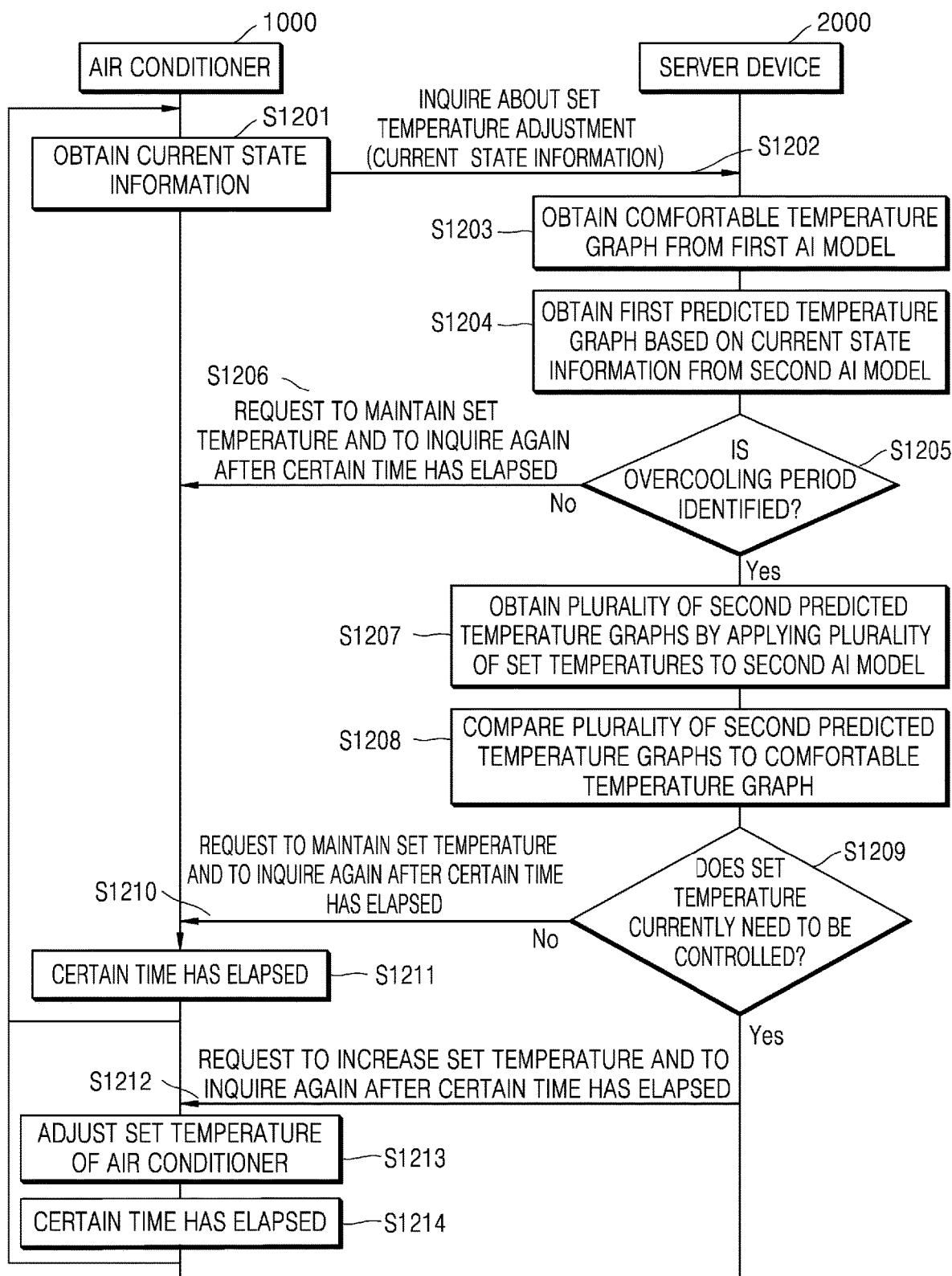
FIG. 12 is a flowchart of a method of adjusting a set temperature of an air conditioner, according to an embodiment of the disclosure.

FIG. 12 is a flowchart of a method of adjusting a set temperature of the air conditioner 1000, according to an embodiment of the disclosure.

In operation S1201, the air conditioner 1000 according to an embodiment of the disclosure may obtain current state information. For example, the air conditioner 1000 may obtain at least one of operation time information (e.g., time information from an operation start timing to a current timing), set temperature information of the air conditioner 1000, or current indoor temperature information, but is not limited thereto. For example, the air conditioner 1000 may further obtain fan speed information, device performance information, and indoor humidity information as the current state information.

In operation S1202, the air conditioner 1000 according to an embodiment of the disclosure may inquire of the server device 2000 about set temperature adjustment. In this case, the air conditioner 1000 may transmit the current state information to the server device 2000.

In operation S1203, when the inquiry is received from the air conditioner 1000, the server device 2000 according to an embodiment of the disclosure may obtain a comfortable temperature graph from the first AI model 201. In this case, the comfortable temperature graph may include an unstable period in which a comfortable temperature is increased based on an operation time of the air conditioner 1000, and a stable period in which the comfortable temperature is constantly maintained. The operation, performed by the server device 2000, of obtaining the comfortable temperature graph from the first AI model 201 is described in detail above in relation to FIG. 8, and thus a detailed description thereof is not provided herein.

In operation S1204, the server device 2000 according to an embodiment of the disclosure may obtain a first predicted temperature graph based on the current state information from the second AI model 202. For example, the server device 2000 may obtain the first predicted temperature graph by applying at least one of the operation time information of the air conditioner 1000 (e.g., time information from an operation start timing to a current timing), the set temperature information of the air conditioner 1000, or the current indoor temperature information to the second AI model 202. The operation, performed by the server device 2000, of obtaining the first predicted temperature graph is described in detail above in relation to FIG. 9, and thus a detailed description thereof is not provided herein.

In operation S1205, the server device 2000 according to an embodiment of the disclosure may identify whether an overcooling period will occur. The server device 2000 may identify the overcooling period by comparing the comfortable temperature graph to the first predicted temperature graph. For example, the server device 2000 may identify a specific timing when the first predicted temperature graph is reduced below the comfortable temperature graph, and determine that overcooling will occur from the specific timing.

In operation S1206, when the overcooling period is not identified, the set temperature of the air conditioner 1000 at a current timing does not need to be adjusted, and thus the server device 2000 according to an embodiment of the disclosure may request the air conditioner 1000 to maintain the current set temperature and to inquire again after a certain time has elapsed. For example, the server device 2000 may request the air conditioner 1000 to inquire about set temperature adjustment again after 10 minutes.

Herein, the certain time may be arbitrarily designated by the server device 2000. For example, the server device 2000 may designate the certain time as a short time when an indoor temperature changes rapidly, and designate the certain time as a long time when the indoor temperature changes gently. For example, the server device 2000 may designate the certain time within 5 minutes when the temperature change is greater than a first threshold value, designate the certain time between 10 minutes and 30 minutes when the temperature change is between the first threshold value and a second threshold value, and designate the certain time as 30 minutes or more when the temperature change is less than the second threshold value.

In operation S1207, when the overcooling period is identified, the server device 2000 according to an embodiment of the disclosure may obtain a plurality of second predicted temperature graphs by applying a plurality of set temperatures to the second AI model 202. Because the indoor temperature changes based on the set temperature of the air conditioner 1000, the plurality of second predicted temperature graphs may have various forms.

In operation S1208, the server device 2000 according to an embodiment of the disclosure may compare the plurality of second predicted temperature graphs to the comfortable temperature graph. For example, the server device 2000 may identify a predicted temperature graph which is not reduced below the comfortable temperature graph, from among the plurality of second predicted temperature graphs.

In operation S1209, the server device 2000 according to an embodiment of the disclosure may determine whether the set temperature of the air conditioner 1000 currently needs to be controlled, based on the result of comparing the plurality of second predicted temperature graphs to the comfortable temperature graph.

For example, when the predicted temperature graph is increased above the comfortable temperature graph by more than a threshold value because the set temperature of the air conditioner 1000 is currently controlled, the server device 2000 may determine that control is not required at the current timing. When the predicted temperature graph is higher than the comfortable temperature graph by more than the threshold value, it may mean that the indoor temperature is not sufficiently reduced to a temperature at which a user feels comfortable. Therefore, when the set temperature is currently controlled, overcooling will not occur but the user may feel hot, and thus the server device 2000 may determine that the set temperature does not need to be controlled at the current timing.

Meanwhile, when a predicted temperature graph obtained by applying a first temperature to the second AI model 202 is close to the comfortable temperature graph, the server device 2000 may determine that the set temperature of the air conditioner 1000 needs to be controlled to the first temperature at the current timing.

In operation S1210, when it is determined that the set temperature of the air conditioner 1000 does not need to be currently controlled, the server device 2000 according to an embodiment of the disclosure may request the air conditioner 1000 to maintain the current set temperature and to inquire again after a certain time has elapsed. Herein, the certain time may be arbitrarily designated by the server device 2000. For example, the server device 2000 may designate the certain time as a short time when an indoor temperature changes rapidly, and designate the certain time as a long time when the indoor temperature changes gently.

When it is determined in operation S1211 that the certain time requested by the server device 2000 has elapsed, the air conditioner 1000 according to an embodiment of the disclosure may return to operation S1201 and obtain the current state information again and inquire of the server device 2000 about set temperature adjustment again.

In operation S1212, when it is determined that the set temperature of the air conditioner 1000 needs to be controlled, the server device 2000 according to an embodiment of the disclosure may request the air conditioner 1000 to increase the set temperature and to inquire again after a certain time has elapsed.

For example, when a predicted temperature graph obtained by applying a first temperature to the second AI model 202 is close to the comfortable temperature graph, the server device 2000 may transmit, to the air conditioner 1000, a request instructing to adjust the set temperature of the air conditioner 1000 to the first temperature. The server device 2000 may request the air conditioner 1000 to inquire about set temperature adjustment again after 20 minutes.

In operation S1213, the air conditioner 1000 according to an embodiment of the disclosure may adjust the set temperature based on the set temperature increase request. For example, the air conditioner 1000 may adjust the set temperature to the first temperature.

When it is determined in operation S1214 that the certain time requested by the server device 2000 has elapsed, the air conditioner 1000 according to an embodiment of the disclosure may return to operation S1201 and obtain the current state information again and inquire of the server device 2000 about set temperature adjustment again.

According to an embodiment of the disclosure, because the state of a space where the user is located continuously changes, the server device 2000 may control the set temperature of the air conditioner 1000 at appropriate timings to make the user continuously feel comfortable, by continuously monitoring the state of the space around the user. The operation, performed by the server device 2000, of controlling the set temperature of the air conditioner 1000 by continuously monitoring the state of the space around the user will now be described in more detail with reference to FIGS. 13 and 14.

Figure 13:
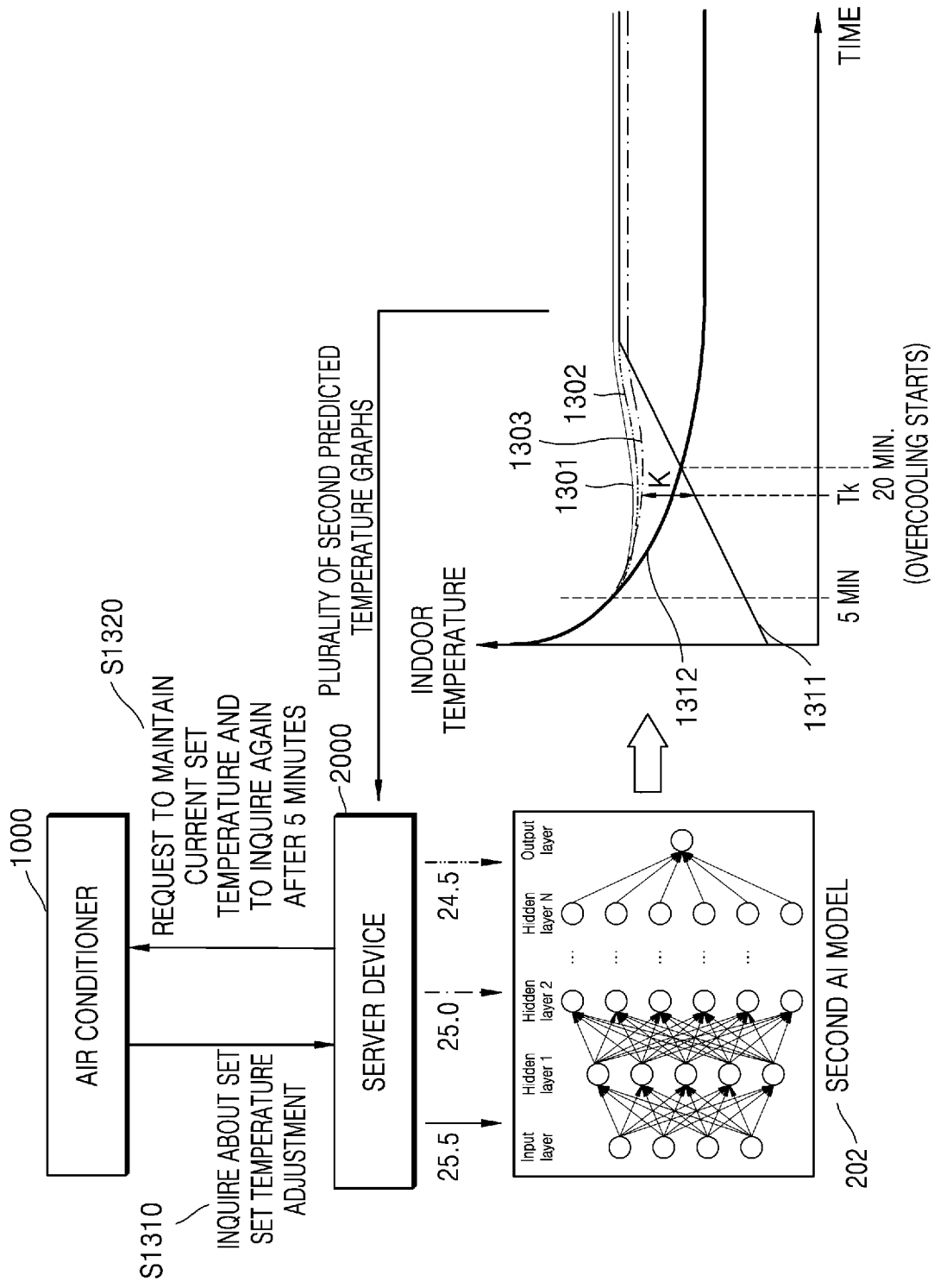
FIG. 13 is a diagram for describing an operation, performed by a server device, of requesting an air conditioner to inquire again after a certain time has elapsed, according to an embodiment of the disclosure.

FIG. 13 is a diagram for describing an operation, performed by the server device 2000, of requesting the air conditioner 1000 to inquire again after a certain time has elapsed, according to an embodiment of the disclosure.

Referring to FIG. 13, the air conditioner 1000 may inquire of the server device 2000 about set temperature adjustment at a timing when 5 minutes have elapsed after starting operation (operation S1310). In this case, the air conditioner 1000 may transmit, to the server device 2000, current state information including operation time information (e.g., 5 minutes), a current indoor temperature (e.g., 26° C.), and a current set temperature (e.g., 18° C.).

The server device 2000 may compare a comfortable temperature graph 1311 obtained from the first AI model 201, to a first predicted temperature graph 1312 obtained by applying the current state information to the second AI model 202. The server device 2000 may predict that overcooling will occur from a timing when 20 minutes have elapsed after the air conditioner 1000 starts to operate, based on the comparison result. In this case, the server device 2000 may obtain a plurality of second predicted temperature graphs 1301, 1302, and 1303 by applying a plurality of set temperatures to the second AI model 202. For example, the server device 2000 may obtain a second-1 predicted temperature graph 1301 by applying a set temperature of 25.5° C. to the second AI model 202, obtain a second-2 predicted temperature graph 1302 by applying a set temperature of 25.0° C. to the second AI model 202, and obtain a second-3 predicted temperature graph 1303 by applying a set temperature of 24.5° C. to the second AI model 202.

Because all of the plurality of second predicted temperature graphs 1301, 1302, and 1303 are higher than the comfortable temperature graph 1311 by more than a threshold temperature K (e.g., 2° C.) at a timing $T_k$, the server device 2000 may determine that the set temperature of the air conditioner 1000 does not need to be currently controlled. When the server device 2000 adjusts the set temperature of the air conditioner 1000 at a current timing (e.g., 5 minutes after the air conditioner 1000 starts to operate), an indoor temperature is not sufficiently reduced to a temperature at which a user feels comfortable, and thus the server device 2000 may determine not to adjust the set temperature of the air conditioner 1000 at the current timing.

The server device 2000 may request the air conditioner 1000 to maintain the current set temperature and to inquire about set temperature adjustment again after 5 minutes (operation S1320). In this case, the air conditioner 1000 may maintain the current set temperature. When a certain time requested by the server device 2000 (e.g., 5 minutes) has elapsed, the air conditioner 1000 may inquire of the server device 2000 about set temperature adjustment again. A detailed description thereof will now be provided with reference to FIG. 14.

Figure 14:
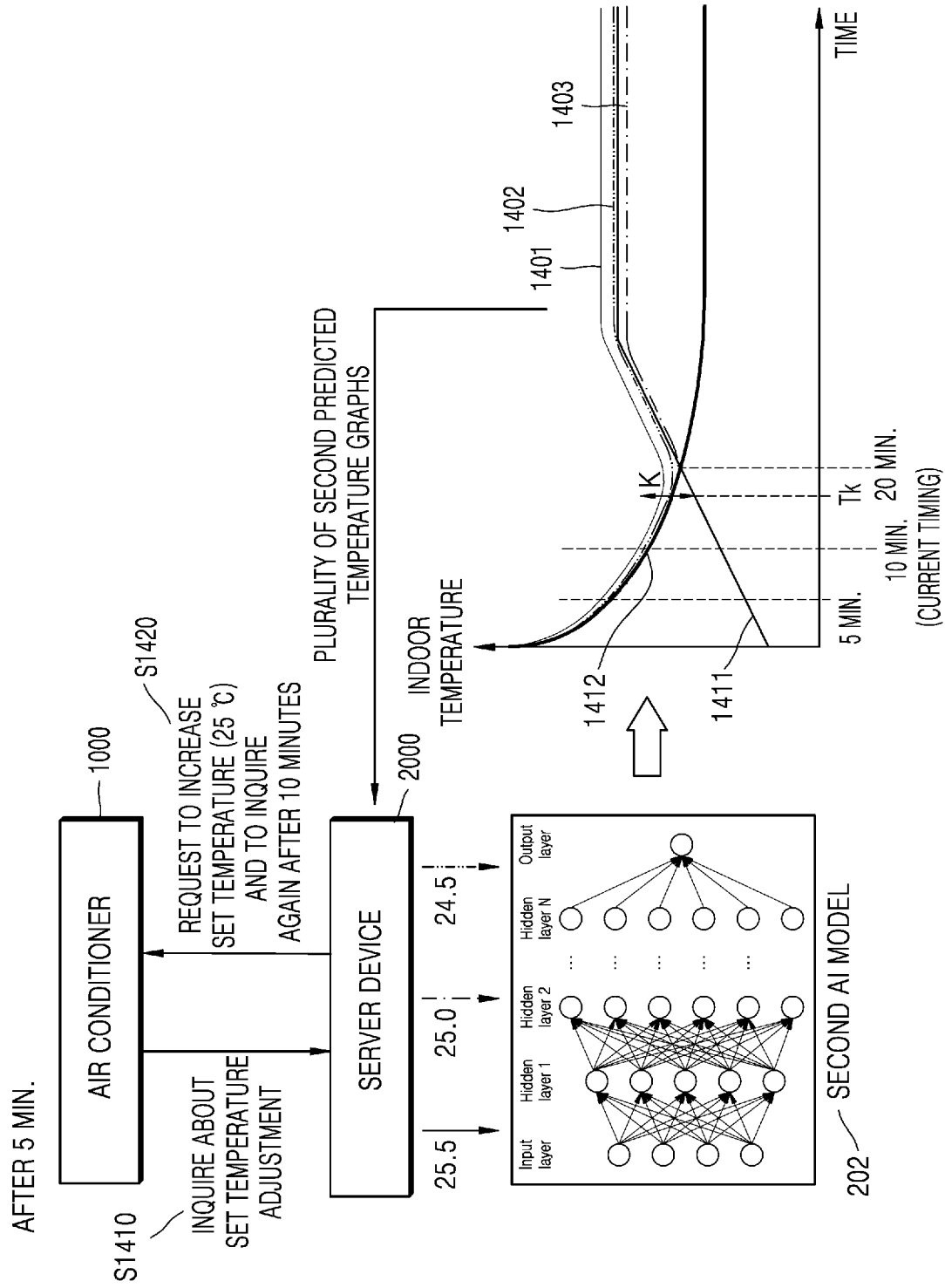
FIG. 14 is a diagram for describing an operation, performed by an air conditioner, of inquiring of a server device about set temperature adjustment again after a certain time has elapsed, according to an embodiment of the disclosure.

FIG. 14 is a diagram for describing an operation, performed by the air conditioner 1000, of inquiring of the server device 2000 about set temperature adjustment again after a certain time has elapsed, according to an embodiment of the disclosure.

Referring to FIG. 14, when a certain time requested by the server device 2000 (e.g., 5 minutes) has elapsed, the air conditioner 1000 may inquire of the server device 2000 about set temperature adjustment (operation S1410). For example, because the server device 2000 has requested to inquire about set temperature adjustment again after 5 minutes at the timing when 5 minutes have elapsed after the air conditioner 1000 starts to operate, the air conditioner 1000 may inquire of the server device 2000 about set temperature adjustment at a timing when 10 minutes have elapsed after starting operation. In this case, the air conditioner 1000 may transmit, to the server device 2000, current state information including operation time information (e.g., 10 minutes), a current indoor temperature (e.g., 22° C.), and a current set temperature (e.g., 18° C.).

The server device 2000 may compare a comfortable temperature graph 1411 obtained from the first AI model 201, to a first predicted temperature graph 1412 obtained by applying the current state information to the second AI model 202. The server device 2000 may predict that overcooling will occur from a timing when 20 minutes have elapsed after the air conditioner 1000 starts to operate, based on the comparison result. In this case, the server device 2000 may obtain a plurality of second predicted temperature graphs 1401, 1402, and 1403 by applying a plurality of set temperatures to the second AI model 202. For example, the server device 2000 may obtain a second-1 predicted temperature graph 1401 by applying a set temperature of 25.5° C. to the second AI model 202, obtain a second-2 predicted temperature graph 1402 by applying a set temperature of 25.0° C. to the second AI model 202, and obtain a second-3 predicted temperature graph 1403 by applying a set temperature of 24.5° C. to the second AI model 202.

Because differences between the comfortable temperature graph 1411 at a timing $T_k$ and the plurality of second predicted temperature graphs 1401, 1402, and 1403 at the timing $T_k$ are less than a threshold temperature K (e.g., 2° C.), the server device 2000 may determine that the set temperature of the air conditioner 1000 needs to be controlled at a current timing (e.g., 10 minutes after starting operation). The second-1 predicted temperature graph 1401 corresponding to the set temperature of 24.5° C. shows an overcooling period in which a predicted indoor temperature is reduced below a comfortable temperature from a timing $T_2$, and thus the server device 2000 may not select 24.5° C. as the set temperature of the air conditioner 1000. When the second-2 predicted temperature graph 1402 corresponding to the set temperature of 25.0° C. is compared to the second-3 predicted temperature graph 1403 corresponding to the set temperature of 25.5° C., the second-2 predicted temperature graph 1402 is closest to the comfortable temperature graph 1411. The second-2 predicted temperature graph 1402 may not be reduced below the comfortable temperature graph 1411 and converge on the comfortable temperature graph 1411. Therefore, the server device 2000 may select 25.0° C. as the set temperature of the air conditioner 1000.

Because the set temperature of the air conditioner 1000 is determined as 25.0° C. by using the second AI model 202, the server device 2000 may transmit, to the air conditioner 1000, a set temperature increase request instructing to change the set temperature to 25° C. (operation S1420). In this case, the server device 2000 may request the air conditioner 1000 to inquire about set temperature adjustment again after 10 minutes.

The air conditioner 1000 may change the set temperature from 18° C. to 25° C. at 10 minutes after starting operation, based on the set temperature increase request. In this case, because the predicted indoor temperature is close to the comfortable temperature, a user may continuously feel comfortable. When 10 minutes have elapsed after the air conditioner 1000 changes the set temperature to 25° C., the air conditioner 1000 may inquire of the server device 2000 about set temperature adjustment again. Meanwhile, the air conditioner 1000 may receive the set temperature increase request from the server device 2000 a plurality of times. The operation, performed by the air conditioner 1000, of receiving the set temperature increase request from the server device 2000 a plurality of times will now be described in detail with reference to FIGS. 15A and 15B.

Figure 15A:
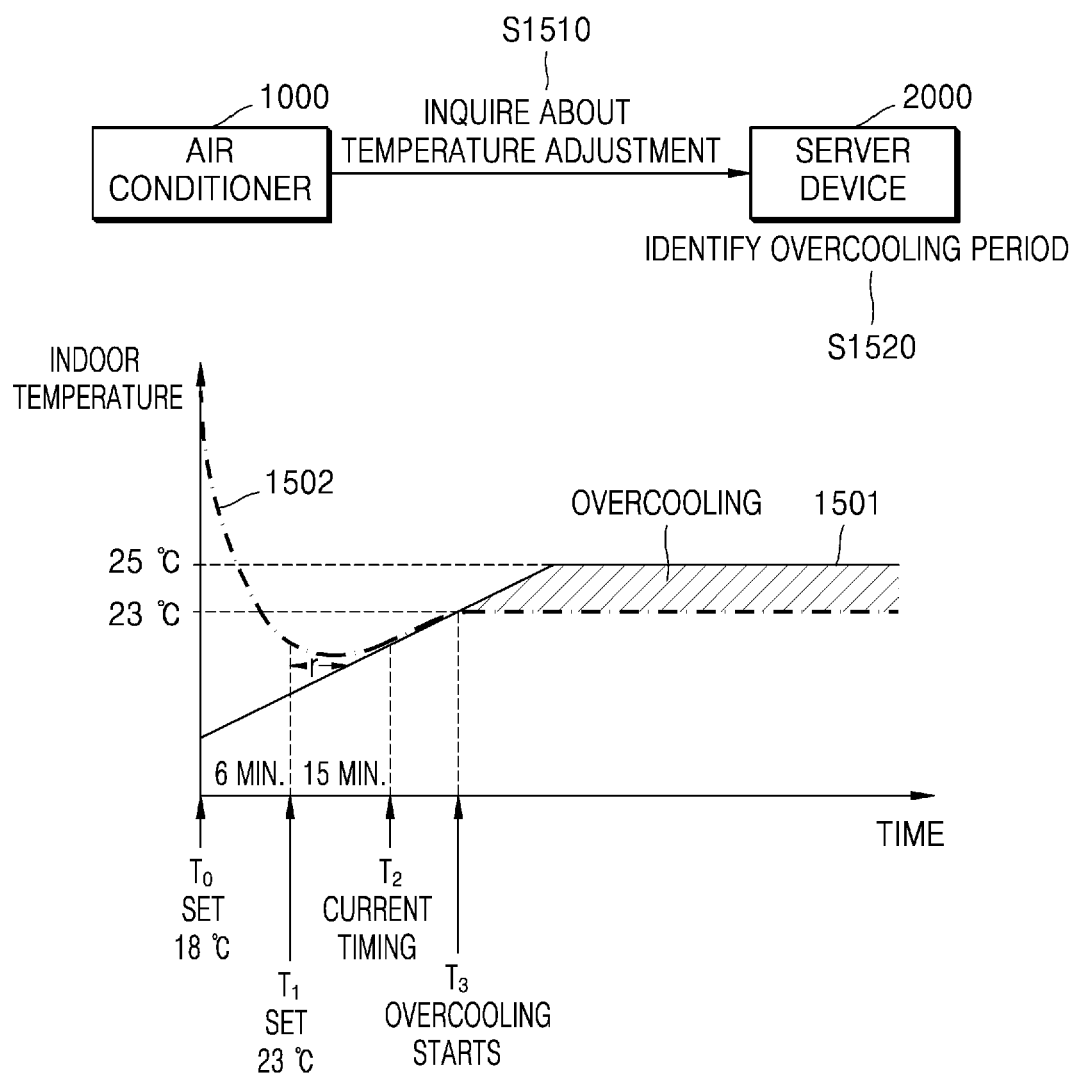
FIGS. 15A and 15B are diagrams for describing an operation, performed by an air conditioner, of adjusting a set temperature a plurality of times, according to an embodiment of the disclosure.
Figure 15B:
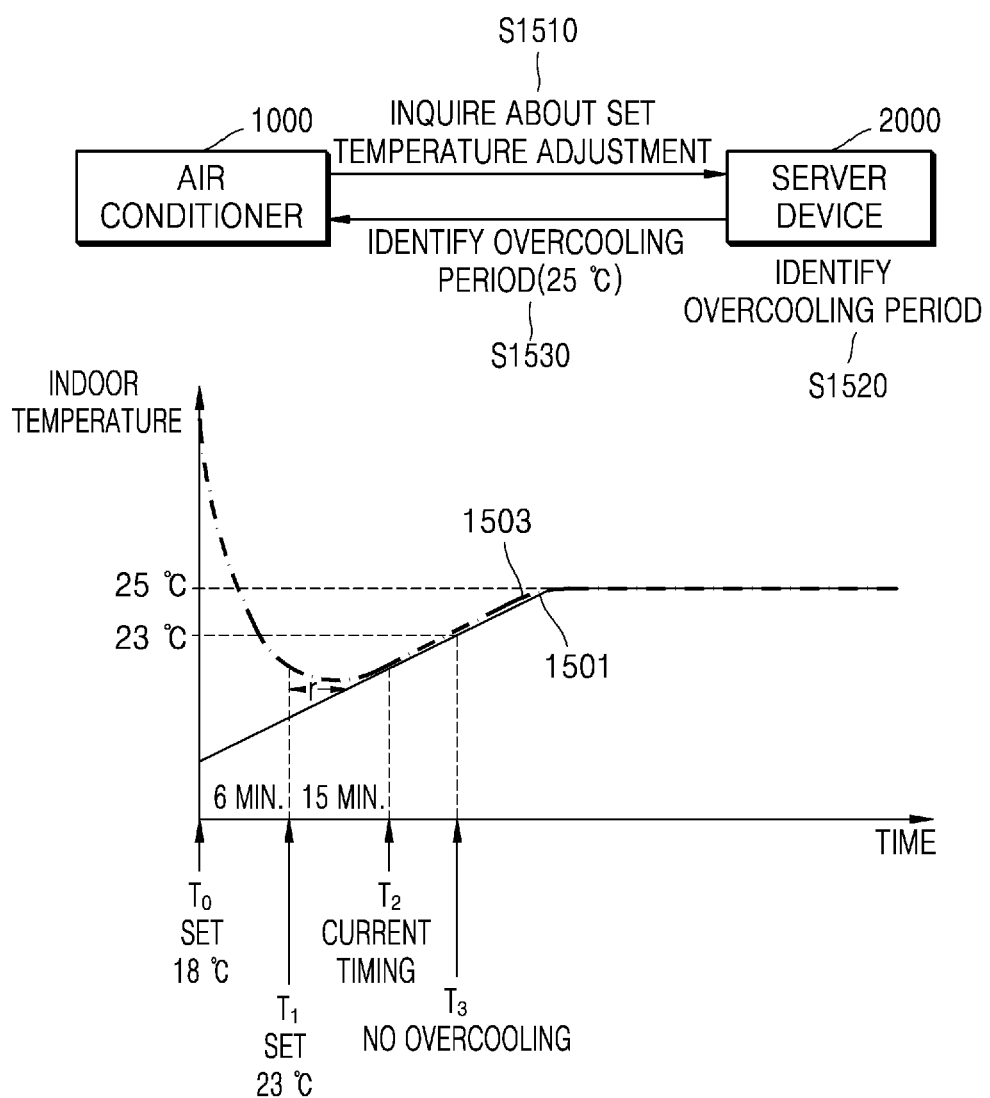

FIGS. 15A and 15B are diagrams for describing an operation, performed by the air conditioner 1000, of adjusting a set temperature a plurality of times, according to an embodiment of the disclosure.

Referring to FIG. 15A, the air conditioner 1000 may start to operate at a timing $T_0$ and adjust a set temperature to 18° C. The air conditioner 1000 may inquire of the server device 2000 about set temperature adjustment at a timing $T_1$ when 6 minutes have elapsed after starting operation, and receive, from the server device 2000, a set temperature increase request instructing to change the set temperature to 23° C. The air conditioner 1000 may receive, from the server device 2000, a request instructing to inquire about set temperature adjustment again after 9 minutes. The air conditioner 1000 may change the set temperature from 18° C. to 23° C. at the timing $T_1$ (e.g., 6 minutes after starting operation) based on the set temperature increase request. Even when the air conditioner 1000 changes the set temperature to 23° C. at the timing $T_1$, an indoor temperature is not immediately increased due to thermal inertia, but is further reduced during a time r and then is increased after the time r has elapsed.

The air conditioner 1000 may inquire of the server device 2000 about set temperature adjustment again at a current timing $T_2$ (e.g., 15 minutes after starting operation) when 9 minutes have elapsed from the timing $T_1$ (e.g., 6 minutes after starting operation) (operation S1510). For example, the air conditioner 1000 may inquire about set temperature adjustment by transmitting, to the server device 2000, current state information including operation time information at the current timing $T_2$ (e.g., 15 minutes after starting operation), indoor temperature information at the current timing $T_2$ (e.g., 20° C.), and set temperature information at the current timing $T_2$ (e.g., 23° C.).

When the set temperature adjustment inquiry is received, the server device 2000 may identify an overcooling period by comparing a comfortable temperature graph 1501 obtained from the first AI model 201, to a first predicted temperature graph 1502 obtained from the second AI model 202 based on the current state information (operation S1520). For example, the server device 2000 may determine that overcooling will occur from a timing $T_3$ when the first predicted temperature graph 1502 is reduced below the comfortable temperature graph 1501. In this case, the server device 2000 may determine a set temperature to be set at the current timing $T_2$, by using the second AI model 202.

Referring to FIG. 15B, the server device 2000 may obtain one or more second predicted temperature graphs by applying one or more set temperatures to the second AI model 202. The server device 2000 may determine 25° C. from among the one or more set temperatures, based on the one or more second predicted temperature graphs. In this case, a predicted temperature graph 1503 corresponding to the set temperature of 25° C. may not be reduced below the comfortable temperature graph 1501 and be closest to the comfortable temperature graph 1501.

The server device 2000 may transmit, to the air conditioner 1000, a request instructing to increase the set temperature to 25° C. (operation S1530). The air conditioner 1000 may change the set temperature from 23° C. to 25° C. at the timing $T_2$. In this case, overcooling may not occur at the timing $T_3$ and thus a user may continuously feel comfortable.

According to an embodiment of the disclosure, the air conditioner 1000 may gradually change the set temperature from 18° C. to 23° C. at the timing $T_1$ and from 23° C. to 25° C. at the timing $T_2$ in association with the server device 2000, thereby preventing the user from experiencing discomfort due to overcooling. The set temperature of the air conditioner 1000 is changed twice in FIGS. 15A and 15B, but is not limited thereto. The air conditioner 1000 may change the set temperature three or more times in association with the server device 2000.

Meanwhile, the air conditioner 1000 may adjust a fan speed to prevent overcooling. The method, performed by the air conditioner 1000, of adjusting a fan speed will now be described in detail with reference to FIG. 16.

Figure 16:
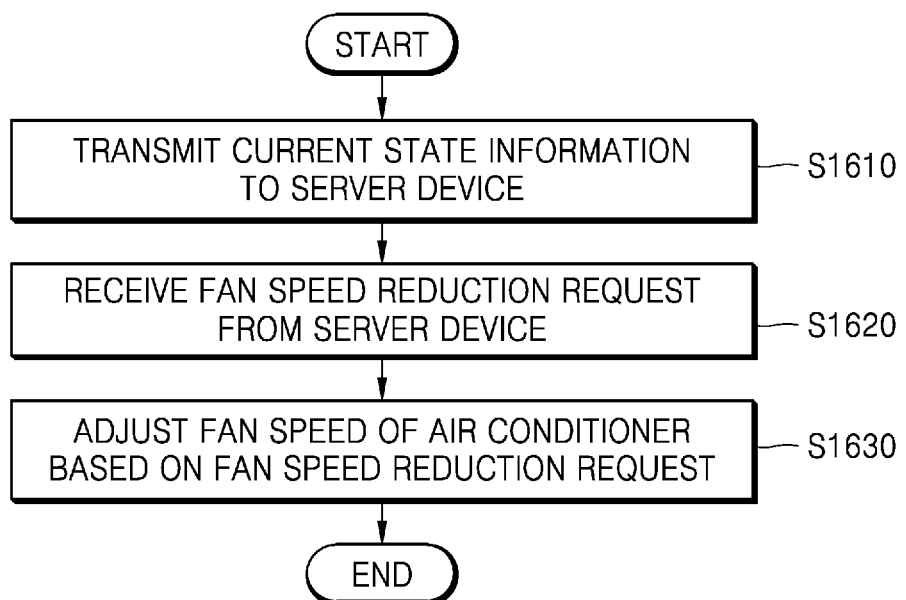
FIG. 16 is a flowchart of a method, performed by an air conditioner, of adjusting a fan speed, according to an embodiment of the disclosure.

FIG. 16 is a flowchart of a method, performed by the air conditioner 1000, of adjusting a fan speed, according to an embodiment of the disclosure.

In operation S1610, the air conditioner 1000 according to an embodiment of the disclosure may transmit current state information to the server device 2000. The air conditioner 1000 may inquire of the server device 2000 about fan speed adjustment.

According to an embodiment of the disclosure, the current state information may include at least one of operation time information of the air conditioner 1000, set temperature information of the air conditioner 1000, current indoor temperature information, or fan speed information, but is not limited thereto. For example, the current state information may further include device performance information and indoor humidity information.

The air conditioner 1000 according to an embodiment of the disclosure may repeatedly inquire about fan speed adjustment by transmitting the current state information to the server device 2000 while operating in an AI comfort mode. For example, the air conditioner 1000 may inquire of the server device 2000 about fan speed adjustment in a certain cycle or at a timing designated by the server device 2000.

In operation S1620, the air conditioner 1000 according to an embodiment of the disclosure may receive a fan speed reduction request from the server device 2000 in response to the current state information.

For example, when an overcooling period, in which a first predicted temperature graph obtained from the second AI model 202 based on the current state information is reduced below a comfortable temperature graph obtained from the first AI model 201 based on the fan speed information, is identified, the air conditioner 1000 may receive the fan speed reduction request from the server device 2000. According to an embodiment of the disclosure, the fan speed reduction request may include a fan speed value. The fan speed reduction request may include next inquiry timing information (e.g., after 5 minutes).

According to an embodiment of the disclosure, when the current state information is received from the air conditioner 1000, the server device 2000 may obtain the comfortable temperature graph from the first AI model 201. The comfortable temperature graph may indicate a set of temperatures at which a user feels comfortable based on an operation time of the air conditioner 1000. The comfortable temperature graph may vary depending on the current fan speed. Therefore, the server device 2000 may obtain the comfortable temperature graph by applying, to the first AI model 201, the fan speed information included in the current state information. The server device 2000 may obtain the first predicted temperature graph by applying, to the second AI model 202, the current state information received from the air conditioner 1000. The server device 2000 may identify that an overcooling period in which the first predicted temperature graph is reduced below the comfortable temperature graph will occur at a future timing, by comparing the comfortable temperature graph to the first predicted temperature graph.

When the overcooling period is identified, the server device 2000 may generate a fan speed reduction request including information instructing to change the fan speed of the air conditioner 1000 to a first level. In this case, the first level may be determined by applying one or more fan speeds to the first and second AI models 201 and 202. For example, the server device 2000 may obtain one or more second comfortable temperature graphs by applying the one or more fan speeds to the first AI model 201. The server device 2000 may obtain one or more second predicted temperature graphs by applying the one or more fan speeds to the second AI model 202. The server device 2000 may determine the fan speed of the first level from among the one or more fan speeds, based on a result of comparing the one or more second comfortable temperature graphs to the one or more second predicted temperature graphs. The second predicted temperature graph obtained by applying the fan speed of the first level to the second AI model 202 may not be reduced below the second comfortable temperature graph obtained by applying the fan speed of the first level to the first AI model 201, and converge on the second comfortable temperature graph. Herein, the first level may be lower than the fan speed currently set in the air conditioner 1000.

The server device 2000 may transmit, to the air conditioner 1000, the fan speed reduction request instructing to adjust the fan speed to the first level. The server device 2000 may request the air conditioner 1000 to inquire about fan speed adjustment again after a certain time has elapsed.

In operation S1630, the air conditioner 1000 according to an embodiment of the disclosure may adjust the fan speed of the air conditioner 1000 based on the fan speed reduction request. For example, when the fan speed reduction request includes information instructing to change the fan speed to the first level (e.g., Low), and when the current fan speed is 'High', the air conditioner 1000 may adjust the fan speed from 'High' to 'Low'.

Meanwhile, the air conditioner 1000 may receive a request instructing to inquire about fan speed adjustment again after a certain time has elapsed, from the server device 2000 together with the fan speed reduction request. In this case, when the certain time designated by the server device 2000 has elapsed, the air conditioner 1000 may inquire about fan speed adjustment again by transmitting the current state information to the server device 2000.

According to an embodiment of the disclosure, the air conditioner 1000 may control the fan speed by using the first and second AI models 201 and 202 driven by the server device 2000, in such a manner that the user always feels comfortable without feeling cold. The operation, performed by the air conditioner 1000, of adjusting the fan speed in association with the server device 2000 will now be described in more detail with reference to FIG. 17.

Figure 17:
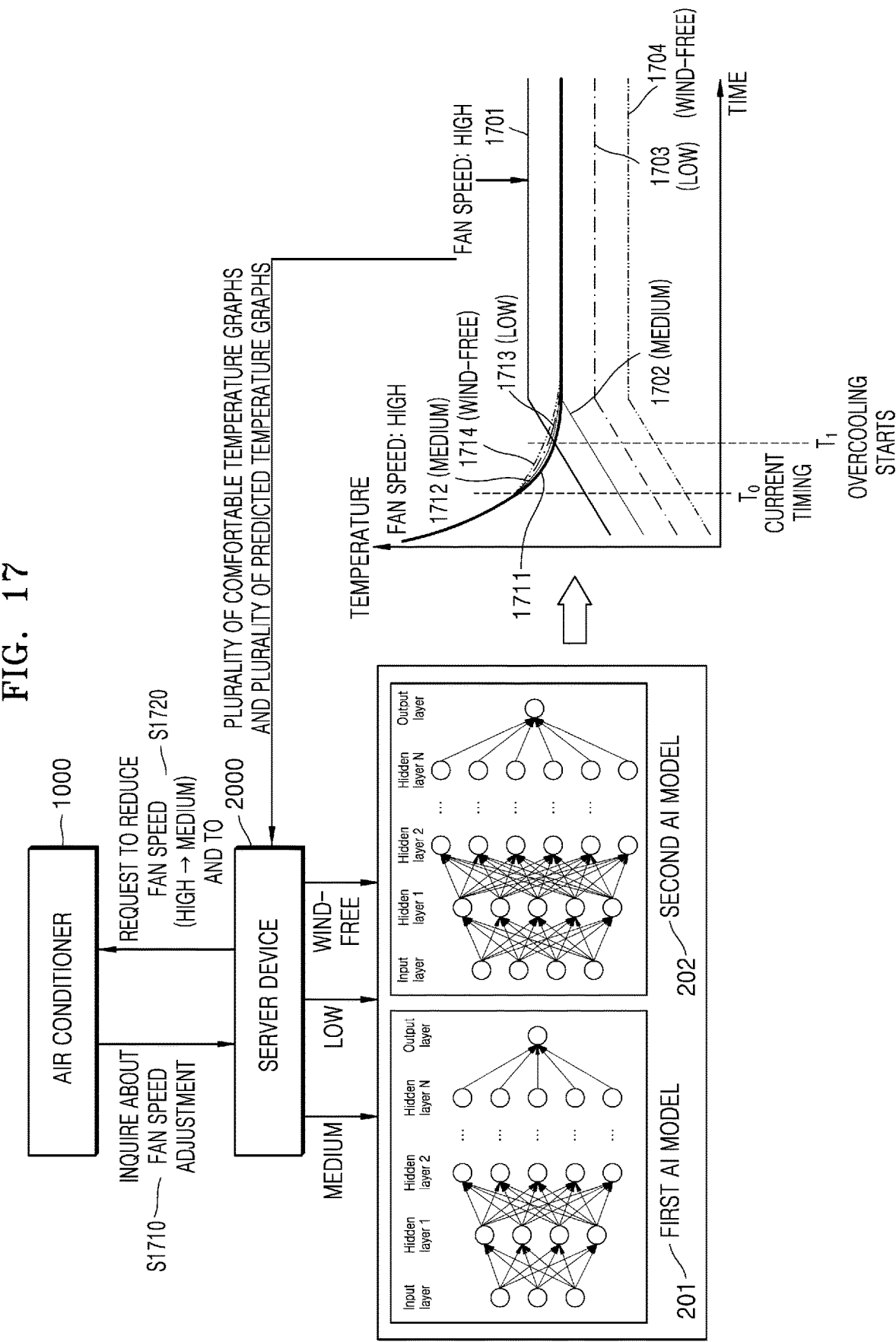
FIG. 17 is a diagram for describing an operation, performed by a server device, of determining a fan speed of an air conditioner by using a first AI model and a second AI model, according to an embodiment of the disclosure.

FIG. 17 is a diagram for describing an operation, performed by the server device 2000, of determining a fan speed of the air conditioner 1000 by using the first AI model 201 and the second AI model 202, according to an embodiment of the disclosure.

Referring to FIG. 17, the air conditioner 1000 may inquire of the server device 2000 about fan speed adjustment at a timing $T_0$ when 10 minutes have elapsed after starting operation (operation S1710). In this case, the air conditioner 1000 may transmit, to the server device 2000, current state information including operation time information (e.g., 10 minutes), a current indoor temperature (e.g., 24° C.), a current set temperature (e.g., 18° C.), and a current fan speed (e.g., High).

The server device 2000 may compare a first comfortable temperature graph 1701 obtained by applying the current fan speed (e.g., High) to the first AI model 201, to a first predicted temperature graph 1711 obtained by applying the current state information to the second AI model 202. The server device 2000 may predict that overcooling will occur from a timing $T_1$, based on the comparison result.

When it is predicted that overcooling will occur, the server device 2000 may obtain a plurality of comfortable temperature graphs 1702, 1703, and 1704 by applying a plurality of fan speeds (e.g., Medium, Low, and Wind-free) to the first AI model 201. For example, the server device 2000 may obtain a second comfortable temperature graph 1702 by applying the 'Fan speed: Medium' to the first AI model 201, obtain a third comfortable temperature graph 1703 by applying the 'Fan speed: Low' to the first AI model 201, and obtain a fourth comfortable temperature graph 1704 by applying the 'Fan speed: Wind-free' to the first AI model 201. The second comfortable temperature graph 1702 may be 1° C. lower than the first comfortable temperature graph 1701, the third comfortable temperature graph 1703 may be 2° C. lower than the first comfortable temperature graph 1701, and the fourth comfortable temperature graph 1704 may be 3° C. lower than the first comfortable temperature graph 1701. That is, the comfortable temperature graph may be reduced when the fan speed is reduced.

Meanwhile, the server device 2000 may obtain a plurality of predicted temperature graphs 1712, 1713, and 1714 by applying the plurality of fan speeds (e.g., Medium, Low, and Wind-free) to the second AI model 202. For example, the server device 2000 may obtain a second predicted temperature graph 1712 by applying the 'Fan speed: Medium' to the second AI model 202, obtain a third predicted temperature graph 1713 by applying the 'Fan speed: Low' to the second AI model 202, and obtain a fourth predicted temperature graph 1714 by applying the 'Fan speed: Wind-free' to the second AI model 202. A temperature indicated by the predicted temperature graph may be reduced gently when the fan speed is reduced.

The server device 2000 may determine the fan speed as 'Medium' by comparing the plurality of comfortable temperature graphs 1701, 1702, 1703, and 1704 to the plurality of predicted temperature graphs 1711, 1712, 1713, and 1714. The second predicted temperature graph 1712 obtained by applying the 'Fan speed: Medium' to the second AI model 202 is not reduced below the second comfortable temperature graph 1702 obtained by applying the 'Fan speed: Medium' to the first AI model 201, and converges on the second comfortable temperature graph 1702. Therefore, when the fan speed of the air conditioner 1000 is adjusted from High to Medium, discomfort of a user due to overcooling may be prevented.

The server device 2000 may transmit, to the air conditioner 1000, a fan speed reduction request instructing to adjust the fan speed to Medium (operation S1720) and, in this case, the server device 2000 may request the air conditioner 1000 to inquire about fan speed adjustment again after 10 minutes.

The air conditioner 1000 may change the fan speed from High to Medium based on the fan speed reduction request. In this case, because the predicted indoor temperature is close to the comfortable temperature, the user may continuously feel comfortable. When 10 minutes have elapsed after the air conditioner 1000 changes the fan speed to Medium, the air conditioner 1000 may inquire of the server device 2000 about fan speed adjustment again.

Meanwhile, according to an embodiment of the disclosure, the air conditioner 1000 may receive the fan speed reduction request from the server device 2000 a plurality of times. For example, the air conditioner 1000 may receive, from the server device 2000 at certain time intervals, a first fan speed reduction request instructing to change the fan speed from High to Medium, a second fan speed reduction request instructing to change the fan speed from Medium to Low, and a third fan speed reduction request instructing to change the fan speed from Low to Wind-free.

According to an embodiment of the disclosure, the air conditioner 1000 may receive a set temperature increase request and a fan speed reduction request at the same time from the server device 2000. The operation, performed by the air conditioner 1000, of receiving the set temperature increase request and the fan speed reduction request at the same time from the server device 2000 will now be described in detail with reference to FIG. 18.

Figure 18:
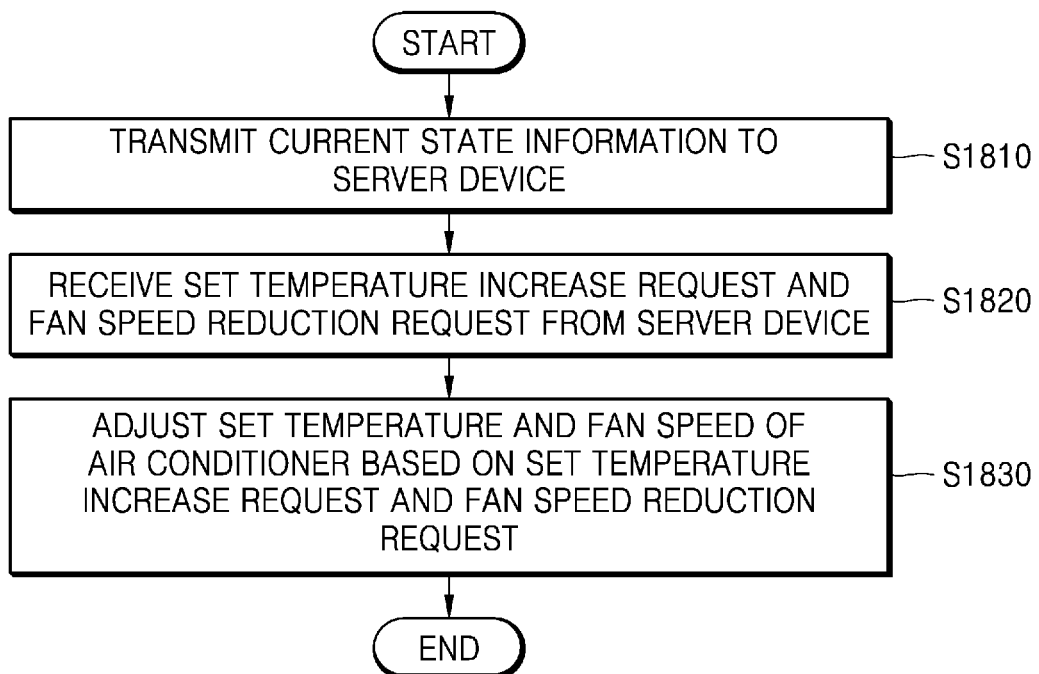
FIG. 18 is a flowchart of a method, performed by an air conditioner, of adjusting a set temperature and a fan speed, according to an embodiment of the disclosure.

FIG. 18 is a flowchart of a method, performed by the air conditioner 1000, of adjusting a set temperature and a fan speed, according to an embodiment of the disclosure.

In operation S1810, the air conditioner 1000 according to an embodiment of the disclosure may transmit current state information to the server device 2000. The air conditioner 1000 may inquire of the server device 2000 about settings.

According to an embodiment of the disclosure, the current state information may include at least one of operation time information of the air conditioner 1000, set temperature information of the air conditioner 1000, current indoor temperature information, or fan speed information, but is not limited thereto. For example, the current state information may further include device performance information and indoor humidity information.

The air conditioner 1000 according to an embodiment of the disclosure may repeatedly inquire about settings by transmitting the current state information to the server device 2000 while operating in an AI comfort mode. For example, the air conditioner 1000 may inquire of the server device 2000 about settings in a certain cycle or at a timing designated by the server device 2000.

In operation S1820, the air conditioner 1000 according to an embodiment of the disclosure may receive a set temperature increase request and a fan speed reduction request from the server device 2000.

For example, when an overcooling period, in which a first predicted temperature graph obtained from the second AI model 202 based on the current state information is reduced below a first comfortable temperature graph obtained from the first AI model 201 based on the fan speed information, is identified, the air conditioner 1000 may receive the set temperature increase request and the fan speed reduction request from the server device 2000. According to an embodiment of the disclosure, the set temperature increase request may include a set temperature value. According to an embodiment of the disclosure, the fan speed reduction request may include a fan speed value. The set temperature increase request and the fan speed reduction request may include next inquiry timing information (e.g., after 5 minutes).

According to an embodiment of the disclosure, when the current state information is received from the air conditioner 1000, the server device 2000 may obtain the first comfortable temperature graph from the first AI model 201. The first comfortable temperature graph may indicate a set of temperatures at which a user feels comfortable based on an operation time of the air conditioner 1000. The first comfortable temperature graph may vary depending on the current fan speed. Therefore, the server device 2000 may obtain the first comfortable temperature graph by applying, to the first AI model 201, the fan speed information included in the current state information. The server device 2000 may obtain the first predicted temperature graph by applying, to the second AI model 202, the current state information received from the air conditioner 1000. The server device 2000 may identify that an overcooling period in which the first predicted temperature graph is reduced below the first comfortable temperature graph will occur at a future timing.

When the overcooling period is identified, the server device 2000 may generate a request including information instructing to change the set temperature of the air conditioner 1000 to a first temperature and change the fan speed of the air conditioner 1000 to a first level.

According to an embodiment of the disclosure, the server device 2000 may determine the first temperature from among one or more set temperatures and determine the first level from among one or more fan speeds, based on a result of comparing one or more second predicted temperature graphs obtained by applying the one or more set temperatures and the one or more fan speeds to the second AI model 202, to one or more second comfortable temperature graphs obtained by applying the one or more fan speeds to the first AI model 201. Herein, the one or more set temperatures may be higher than the current set temperature of the air conditioner 1000, and the one or more fan speeds may be lower than the current fan speed. A predicted temperature graph obtained by applying the fan speed of the first level and the first temperature to the second AI model 202 may not be reduced below a comfortable temperature graph obtained by applying the fan speed of the first level to the first AI model 201, and converge on the comfortable temperature graph.

The server device 2000 may transmit, to the air conditioner 1000, the request instructing to adjust the fan speed to the first level and to adjust the set temperature to the first temperature. The server device 2000 may request the air conditioner 1000 to inquire about settings adjustment again after a certain time has elapsed.

In operation S1830, the air conditioner 1000 according to an embodiment of the disclosure may adjust the set temperature and the fan speed of the air conditioner 1000 based on the set temperature increase request and the fan speed reduction request.

For example, when the set temperature increase request includes information instructing to change the set temperature to the first temperature (e.g., 25° C.), and when the current set temperature is 18° C., the air conditioner 1000 may change the set temperature from 18° C. to 25° C. When the fan speed reduction request includes information instructing to change the fan speed to the first level (e.g., Low), and when the current fan speed is 'High', the air conditioner 1000 may adjust the fan speed from 'High' to 'Low'.

Meanwhile, the air conditioner 1000 may receive a request instructing to inquire about settings adjustment again after a certain time has elapsed, from the server device 2000 together with the set temperature increase request and the fan speed reduction request. In this case, when the certain time designated by the server device 2000 has elapsed, the air conditioner 1000 may inquire about settings adjustment again by transmitting the current state information to the server device 2000.

According to an embodiment of the disclosure, the air conditioner 1000 may control the set temperature and the fan speed by using the first and second AI models 201 and 202 driven by the server device 2000, in such a manner that the user always feels comfortable without feeling cold. The operation, performed by the air conditioner 1000, of adjusting the set temperature and the fan speed in association with the server device 2000 will now be described in more detail with reference to FIGS. 19A and 19B.

Figure 19A:
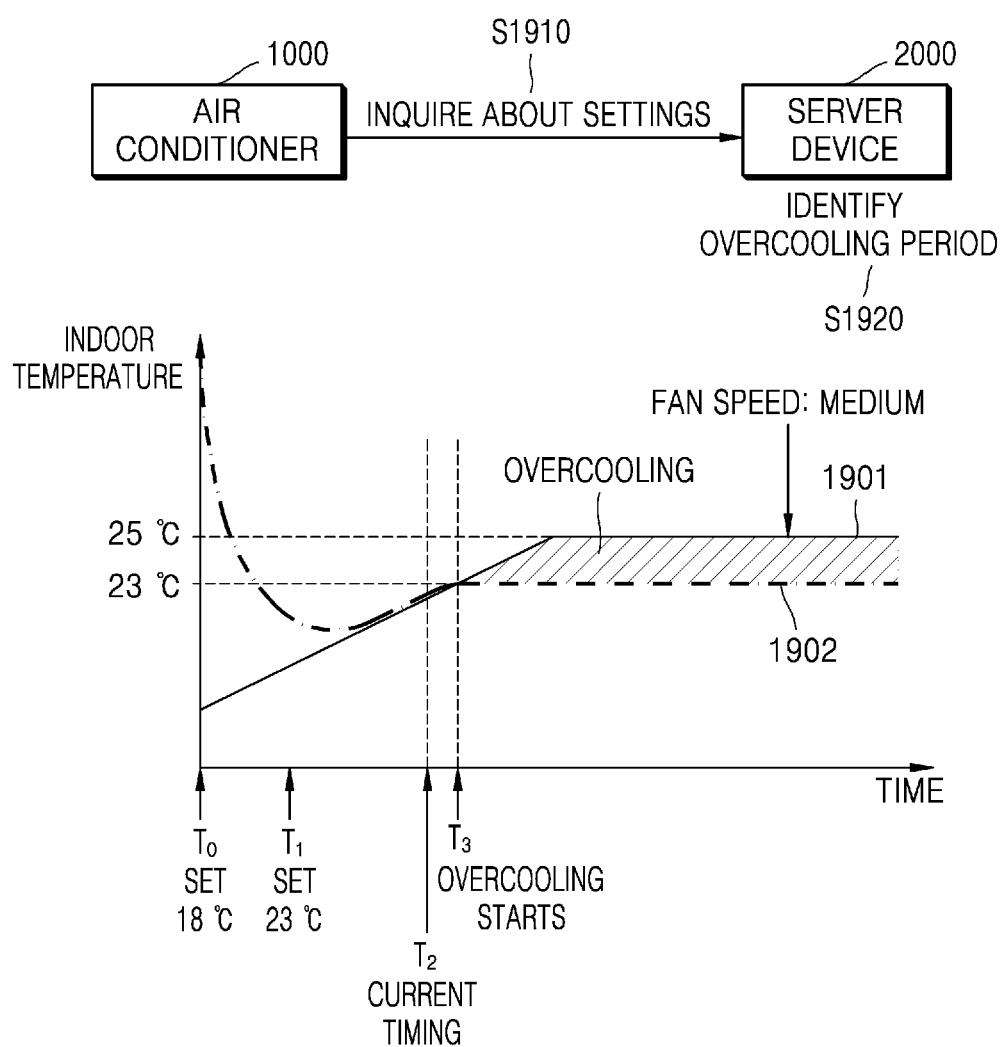
FIGS. 19A and 19B are diagrams for describing an operation, performed by a server device, of determining a set temperature and a fan speed, according to an embodiment of the disclosure.
Figure 19B:
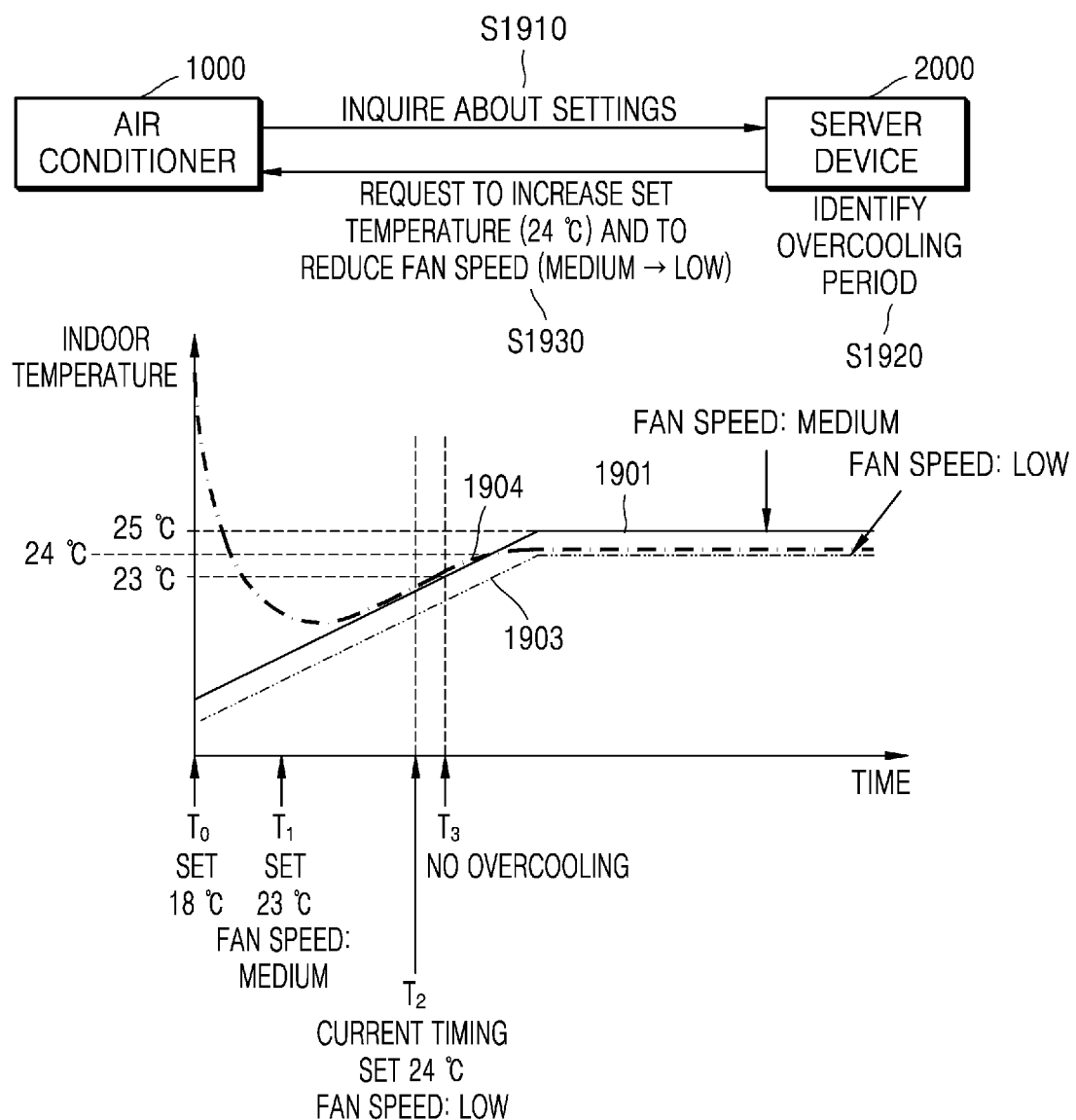

FIGS. 19A and 19B are diagrams for describing an operation, performed by the server device 2000, of determining a set temperature and a fan speed, according to an embodiment of the disclosure.

Referring to FIG. 19A, the air conditioner 1000 may start to operate at a timing $T_0$ and adjust a set temperature to 18° C. The air conditioner 1000 may inquire of the server device 2000 about settings adjustment at a timing $T_1$ when 6 minutes have elapsed after starting operation, and receive, from the server device 2000, a set temperature increase request instructing to change the set temperature to 23° C. The air conditioner 1000 may receive, from the server device 2000, a request instructing to inquire about settings adjustment again after 9 minutes. The air conditioner 1000 may change the set temperature from 18° C. to 23° C. at the timing $T_1$ (e.g., 6 minutes after starting operation) based on the set temperature increase request. Even when the air conditioner 1000 changes the set temperature to 23° C. at the timing $T_1$, an indoor temperature is not immediately increased due to thermal inertia, but is further reduced during a time r and then is increased after the time r has elapsed.

The air conditioner 1000 may inquire of the server device 2000 about settings adjustment again at a current timing $T_2$ (e.g., 15 minutes after starting operation) when 9 minutes have elapsed from the timing $T_1$ (e.g., 6 minutes after starting operation) (operation S1910). For example, the air conditioner 1000 may inquire about settings adjustment by transmitting, to the server device 2000, current state information including operation time information at the current timing $T_2$ (e.g., 15 minutes after starting operation), indoor temperature information at the current timing $T_2$ (e.g., 20° C.), set temperature information at the current timing $T_2$ (e.g., 23° C.), and fan speed information at the current timing $T_2$ (e.g., Fan speed: Medium).

When the settings adjustment inquiry is received, the server device 2000 may identify an overcooling period by comparing a first comfortable temperature graph 1901 obtained from the first AI model 201, to a first predicted temperature graph 1902 obtained from the second AI model 202 (operation S1920). For example, the server device 2000 may determine that overcooling will occur from a timing $T_3$ when the first predicted temperature graph 1902 is reduced below the first comfortable temperature graph 1901. In this case, the server device 2000 may determine a set temperature and a fan speed to be set at the current timing $T_2$, by using the first and second AI models 201 and 202.

Referring to FIG. 19B, the server device 2000 may obtain one or more second predicted temperature graphs by applying one or more set temperatures and one or more fan speeds to the second AI model 202. The server device 2000 may obtain one or more second comfortable temperature graphs by applying the one or more fan speeds to the first AI model 201. The server device 2000 may determine 24° C. from among the one or more set temperatures and determine 'Low' from among the one or more fan speeds, based on the one or more second predicted temperature graphs and the one or more second comfortable temperature graphs. In this case, a second predicted temperature graph 1904 corresponding to the set temperature of 24° C. and the fan speed of 'Low' may not be reduced below a second comfortable temperature graph 1903 and be closest to the second comfortable temperature graph 1903. According to an embodiment of the disclosure, the second comfortable temperature graph 1903 corresponding to the fan speed of 'Low' may be 1° C. lower than the first comfortable temperature graph 1901 corresponding to the fan speed of 'Medium'.

The server device 2000 may transmit, to the air conditioner 1000, a request instructing to increase the set temperature to 24° C. and to reduce the fan speed to 'Low' (operation S1930). The air conditioner 1000 may change the set temperature from 23° C. to 24° C. and change the fan speed from 'Medium' to 'Low' at the timing $T_2$. In this case, overcooling may not occur at the timing $T_3$ and thus a user may continuously feel comfortable.

According to an embodiment of the disclosure, the air conditioner 1000 may adjust the set temperature and the fan speed in association with the server device 2000, thereby preventing the user from experiencing discomfort due to overcooling.

Meanwhile, the server device 2000 may provide information related to the air conditioner 1000 to the user through a display device connected to the server device 2000. The operation, performed by the server device 2000, of providing the information related to the air conditioner 1000 to the user will now be described with reference to FIG. 20.

Figure 20:
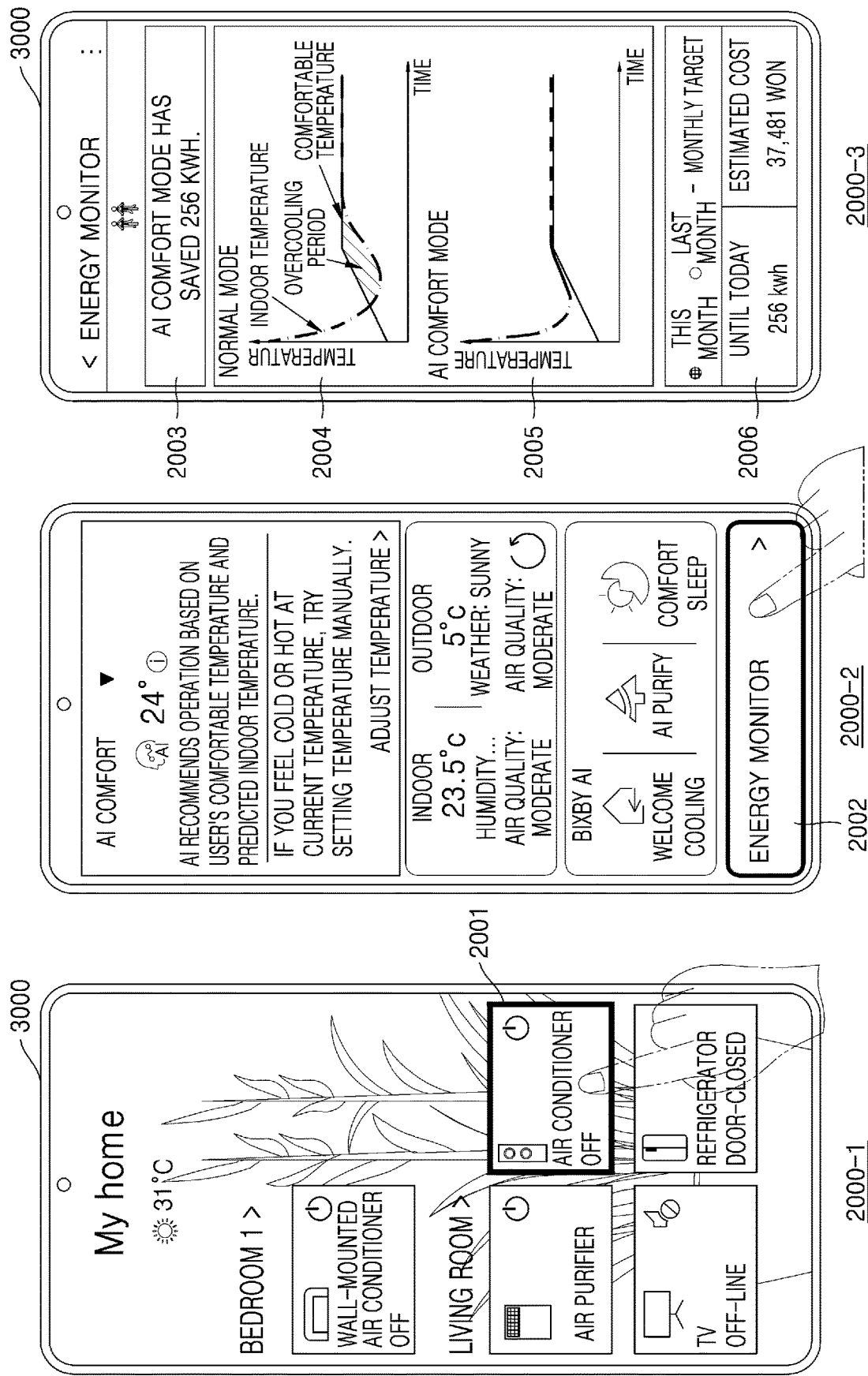
FIG. 20 is a diagram for describing an operation, performed by a server device, of providing energy saving information based on an AI comfort mode through a display device, according to an embodiment of the disclosure.

FIG. 20 is a diagram for describing an operation, performed by the server device 2000, of providing energy saving information based on an AI comfort mode through a display device 3000, according to an embodiment of the disclosure. FIG. 20 shows, as an example, a case when the display device 3000 executes a specific application provided by the server device 2000. The specific application may be a computer program for providing information related to home appliances.

Referring to reference numeral 2000-1 of FIG. 20, the display device 3000 may execute the specific application and display a list of home appliances of a user. The home appliances of the user may be connected to the server device 2000 by using the same account. For example, when the user executes the specific application for controlling the home appliances through the display device 3000, the display device 3000 may display icons indicating the air conditioner 1000, a refrigerator, a TV, and an air purifier on an execution screen of the application. In this case, the display device 3000 may receive a user input for selecting an icon 2001 indicating the air conditioner 1000.

According to an embodiment of the disclosure, the display device 3000 may be a device for executing the specific application provided by the server device 2000. The display device 3000 may be a mobile device of the user, a wearable device of the user, a refrigerator including a display, a TV, a desktop computer, or a laptop computer, but is not limited thereto. For convenience of explanation, the display device 3000 is assumed as a mobile device in FIG. 20.

Referring to reference numeral 2000-2 of FIG. 20, the display device 3000 may display an interface screen for providing information about the air conditioner 1000, based on the user input for selecting the icon 2001 indicating the air conditioner 1000. In this case, a current operation mode of the air conditioner 1000 may be displayed on the interface screen. For example, when the air conditioner 1000 is currently operating in an AI comfort mode, an image indicating the AI comfort mode and text such as 'AI comfort' may be displayed at an upper part of the screen.

When the user desires to monitor energy consumption of the air conditioner 1000, the display device 3000 may receive a user input for selecting an energy monitor icon 2002.

Referring to reference numeral 2000-3 of FIG. 20, the display device 3000 may provide energy information related to the AI comfort mode in response to the user input for selecting the energy monitor icon 2002. For example, the display device 3000 may provide information about energy saved in the AI comfort mode compared to a normal mode (e.g., "AI comfort mode has saved 256 kWh"). The display device 3000 may provide a first image 2004 comparatively showing a (predicted) indoor temperature graph and a comfortable temperature graph corresponding to the normal mode, and a second image 2005 comparatively showing a (predicted) indoor temperature graph and a comfortable temperature graph corresponding to the AI comfort mode. The first image 2004 related to the normal mode may show that an overcooling period will occur.

The display device 3000 may provide information 2006 including energy saved in the AI comfort mode compared to the normal mode (e.g., 256 kWh until today), and an estimated cost (e.g., ☐37,481).

Figure 21:
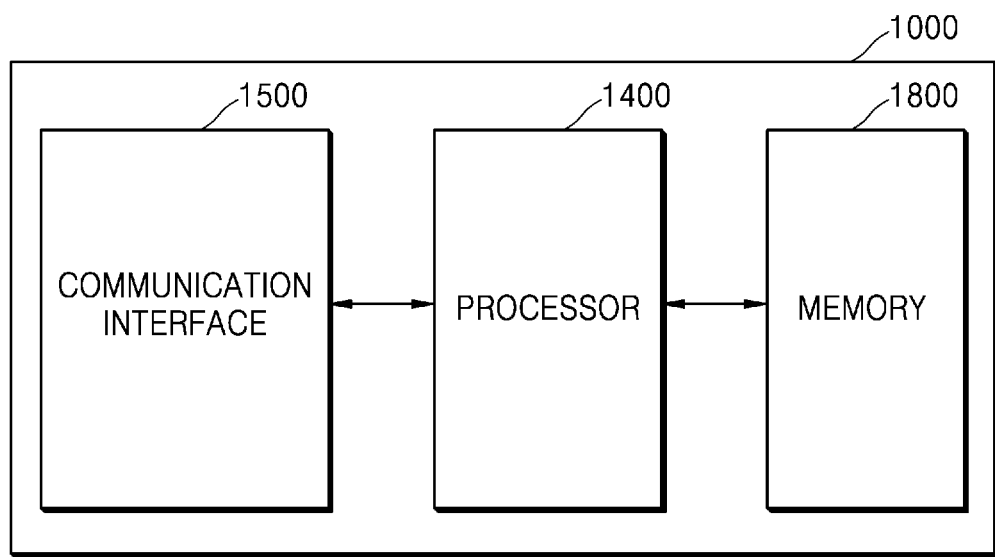
FIG. 21 is a block diagram for describing functions of an air conditioner, according to an embodiment of the disclosure.
Figure 22:
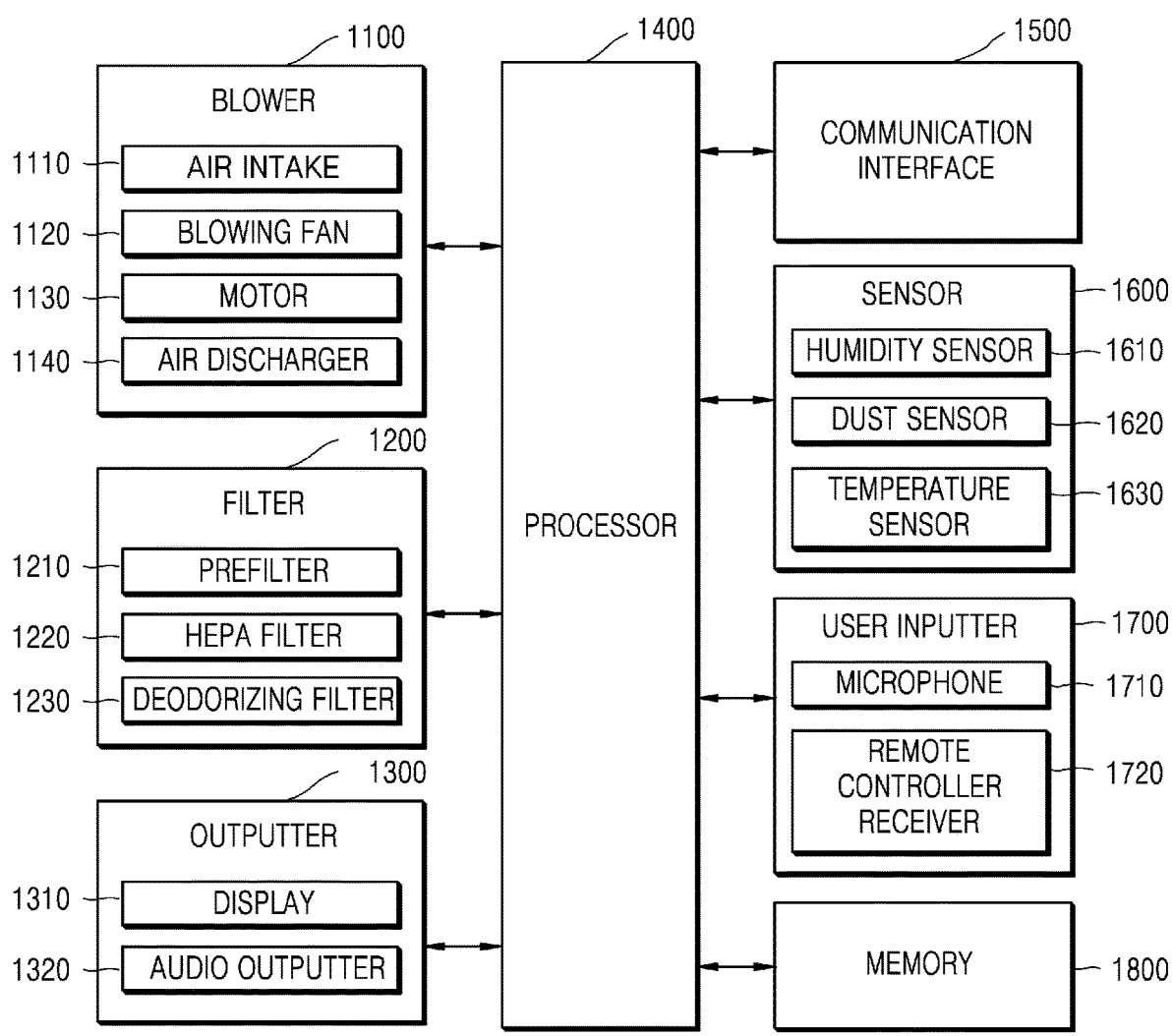
FIG. 22 is a block diagram for describing functions of an air conditioner, according to an embodiment of the disclosure.

FIGS. 21 and 22 are block diagrams for describing functions of the air conditioner 1000, according to an embodiment of the disclosure.

As illustrated in FIG. 21, the air conditioner 1000 according to an embodiment of the disclosure may include a processor 1400, a communication interface 1500, and a memory 1800. However, not all of the illustrated elements are required. The air conditioner 1000 may be implemented with more or less elements than the illustrated elements. As illustrated in FIG. 22, the air conditioner 1000 according to an embodiment of the disclosure may include a blower 1100, a filter 1200, an outputter 1300, the processor 1400, the communication interface 1500, a sensor 1600, a user inputter 1700, and the memory 1800.

The elements of the air conditioner 1000 will now be described one by one.

The blower 1100 may include an air intake 1110, a blowing fan 1120, a motor 1130, and an air discharger 1140, but is not limited thereto. The air intake 1110 may suck in the air around the air conditioner 1000.

The blowing fan 1120 may allow external air to enter the air conditioner 1000 through the air intake 1110 by forming an air flow. Meanwhile, the blowing fan 1120 may also allow the air purified by the filter 1200 to be discharged from the air conditioner 1000 through the air discharger 1140. The blowing fan 1120 may be rotated by the motor 1130 to form an air flow. A rotational speed (i.e., revolutions per minute) of the motor 1130 may be adjusted under the control by the processor 1400.

The blowing fan 1120 may include a high-pass (whirlwind) fan and a circulator fan. Depending on implementation, a plurality of high-pass fans and a plurality of circulator fans may be provided. The high-pass fan may blow out fast and strong cold air. For example, the high-pass fan may blow out strong cold air in a high-pass manner as soon as the air is sucked in. The circulator fan may send wind far away. The circulator fan may form a strong jet stream at a side wind door (e.g., a circular air outlet) with the wind sucked in.

The air discharger 1140 may include a metal cooling panel for discharging the cold air, and the circular air outlet. The metal cooling panel may include 1 mm sand-sized microholes for sending out the cold air. The cold air may be uniformly spread out through the metal cooling panel including the micro-holes.

The filter 1200 may include at least one filter and be mounted in a case body. The filter 1200 may be located adjacent to the air intake 1110 of the air conditioner 1000 to filter out pollutants included in the air entering through the air intake 1110. According to an embodiment of the disclosure, the filter 1200 may include a plurality of filters. For example, the filter 1200 may include a prefilter 1210, a high-efficiency particulate air (HEPA) filter 1220, and a deodorizing filter 1230, but is not limited thereto. For example, the filter 1200 may further include various types of functional filters.

The prefilter 1210 may be a filter for removing relatively large particles. For example, the prefilter 1210 may remove large dust, hair, and pet hair. The HEPA filter 1220 may remove fine dust, mites, viruses, and various bacteria such as fungi. The deodorizing filter 1230 may remove various odors and harmful gases in an indoor environment. The deodorizing filter 1230 may also be referred to as a carbon filter. The functional filters (not shown) may be for removing pollen, dust mites, bacteria, etc. The functional filters (not shown) may include an antibacterial filter and a carbon filter.

The outputter 1300 is for outputting an audio signal or a video signal. The outputter 1300 may include a display 1310 and an audio outputter 1320.

When the display 1310 is layered with a touchpad to configure a touchscreen, the display 1310 may be used not only as an output device but also as an input device. The display 1310 may include at least one of a liquid crystal display (LCD), a thin film transistor-liquid crystal display (TFT-LCD), an organic light-emitting diode (OLED), a flexible display, a three-dimensional (3D) display, or an electrophoretic display. Depending on implementation of the air conditioner 1000, the air conditioner 1000 may include two or more displays 1310.

According to an embodiment of the disclosure, the display 1310 may display an operation mode of the air conditioner 1000, a current indoor temperature, a current indoor humidity, a current fan speed, and a set temperature (or a desired temperature), but is not limited thereto.

The audio outputter 1320 may output audio data received from the communication interface 1500 or stored in the memory 1800. For example, the audio outputter 1320 may output an audio signal related to a function performed by the air conditioner 1000 (e.g., notification sound or voice guidance.

According to an embodiment of the disclosure, the outputter 1300 may include an outputter of a remote controller. For example, the operation mode of the air conditioner 1000, the set temperature, the current fan speed, the current indoor temperature, or the current indoor humidity may be displayed through the outputter of the remote controller. Voice guidance for a user may be output from the remote controller.

According to an embodiment of the disclosure, the outputter 1300 may further include a lighting device (not shown). For example, the outputter 1300 may indicate whether the air conditioner 1000 is operating, an indoor pollution level, or a fan speed by using the lighting device (not shown). The lighting device (not shown) may have various colors.

The outputter 1300 may output information related to replacement of at least one filter included in the filter 1200. For example, the outputter 1300 may output text, an image (e.g., an icon), or voice for guiding a current state of the filter or a time to replace the filter.

The processor 1400 controls overall operation of the air conditioner 1000. For example, the processor 1400 may execute programs stored in the memory 1800 to control the blower 1100, the filter 1200, the outputter 1300, the communication interface 1500, the sensor 1600, the user inputter 1700, the memory 1800, and a power supply (not shown).

According to an embodiment of the disclosure, the processor 1400 may include an AI processor for generating a learning network model, but is not limited thereto. According to an embodiment of the disclosure, the AI processor may be implemented as a chip separate from the processor 1400. According to an embodiment of the disclosure, the AI processor may be a general-purpose chip.

According to an embodiment of the disclosure, the processor 1400 may execute one or more instructions stored in the memory 1800 to transmit, to the server device 2000, current state information including at least one of operation time information of the air conditioner 1000, set temperature information of the air conditioner 1000, or current indoor temperature information.

The processor 1400 receive a set temperature increase request from the server device 2000 in response to the current state information. When an overcooling period, in which a first predicted temperature graph obtained from the second AI model 202 based on the current state information is reduced below a comfortable temperature graph obtained from the first AI model 201, is identified, the processor 1400 may receive the set temperature increase request from the server device 2000. The comfortable temperature graph may include an unstable period in which a comfortable temperature changes based on an operation time of the air conditioner 1000, and a stable period in which the comfortable temperature is constantly maintained. The comfortable temperature graph may be obtained by applying at least one of operation timing information of the air conditioner 1000 (e.g., an operation time point or time period), fan speed information of the air conditioner 1000, indoor humidity information, outdoor humidity information, indoor temperature information, or outdoor temperature information to the first AI model 201. The first predicted temperature graph may be obtained by further applying at least one of operation timing information of the air conditioner 1000, indoor humidity information, outdoor temperature information, outdoor humidity information, weather information, performance information of the air conditioner 1000, or installation space information of the air conditioner 1000 to the second AI model 202.

The processor 1400 may adjust the set temperature of the air conditioner 1000 based on the set temperature increase request. The set temperature increase request may include information instructing to change the set temperature of the air conditioner 1000 to a first temperature.

According to an embodiment of the disclosure, the processor 1400 may receive a fan speed reduction request from the server device 2000 in response to the current state information. In this case, the current state information may further include fan speed information. The processor 1400 may adjust the fan speed of the air conditioner 1000 based on the fan speed reduction request.

The communication interface 1500 may include one or more elements for enabling communication between the air conditioner 1000 and the server device 2000, or between the air conditioner 1000 and the display device 3000. For example, the communication interface 1500 may include a short-range wireless communication interface and a broadcast receiver, but is not limited thereto.

The short-range wireless communication interface may include a Bluetooth communication interface, a BLE communication interface, a NFC interface, a WLAN (or Wi-Fi) communication interface, a Zigbee communication interface, an IrDA communication interface, a WFD communication interface, a UWB communication interface, or an Ant+ communication interface, but is not limited thereto.

The broadcast receiver receives broadcast signals and/or broadcast information from outside through broadcast channels. The broadcast channels may include satellite channels and terrestrial channels. Depending on implementation, the air conditioner 1000 may not include the broadcast receiver.

According to an embodiment of the disclosure, the communication interface 1500 may transmit the current state information to the server device 2000. The communication interface 1500 may transmit the current state information to the server device 2000 in a certain cycle or at a time requested by the server device 2000. The current state information may include at least one of set temperature information of the air conditioner 1000 or current indoor temperature information, but is not limited thereto. For example, the current state information may further include fan speed information, indoor humidity information, and device information.

According to an embodiment of the disclosure, the communication interface 1500 may transmit a set temperature adjustment inquiry or a fan speed adjustment inquiry to the server device 2000. The communication interface 1500 may receive at least one of a set temperature reduction request or a fan speed increase request from the server device 2000. The communication interface 1500 may receive, from the server device 2000, information about a timing to inquire about settings adjustment again. For example, the communication interface 1500 may receive, from the server device 2000, a request instructing to inquire about settings adjustment again after 10 minutes.

According to an embodiment of the disclosure, the communication interface 1500 may obtain location information of the user from a mobile device (not shown) of the user. For example, the communication interface 1500 may obtain the location information (e.g., global positioning system (GPS) information) of the user from the mobile device of the user through short-range wireless communication (e.g., Bluetooth or UWB). According to another embodiment of the disclosure, the communication interface 1500 may obtain the location information of the user from the server device 2000. In this case, the server device 2000 may be connected to the mobile device of the user and the air conditioner 1000 by using a specific account. For example, when the mobile device of the user uploads location information thereof to the server device 2000, the communication interface 1500 may receive the location information of the mobile device from the server device 2000.

The sensor 1600 may include a humidity sensor 1610, a dust sensor 1620, and a temperature sensor 1630, but is not limited thereto. For example, the sensor 1600 may further include a human detection sensor, a gas sensor, a carbon dioxide sensor for measuring a concentration of carbon dioxide in the air, an image sensor for detecting a location of a user, a noise measuring sensor for measuring noise, and a laser sensor for precisely detecting fine particles.

The humidity sensor 1610 may be a sensor for measuring a humidity in the air. The dust sensor 1620 may be a sensor for measuring a concentration of dust in the air. The temperature sensor 1630 may be a sensor for measuring a temperature of the air. The function of each sensor may be intuitively inferred from its name by one of ordinary skill in the art, and thus a detailed description thereof is not provided herein.

The user inputter 1700 refers to the means by which the user inputs data for controlling the air conditioner 1000. For example, the user inputter 1700 may include a keypad, a dome switch, a touchpad (e.g., a capacitive overlay, resistive overlay, infrared beam, surface acoustic wave, integral strain gauge, or piezoelectric touchpad), a jog wheel, or a jog switch, but is not limited thereto.

According to an embodiment of the disclosure, the user inputter 1700 may include a power button, operation mode buttons (e.g., an AI comfort mode button, a cool mode button, a dry mode button, and a purify mode button), a wind-free function button, a temperature control button, a reservation button, a volume control button, a sleep button, and an auto-sterilize button, but is not limited thereto.

The user inputter 1700 may further include a microphone 1710 for receiving voice input of the user. The microphone 1710 may receive an external audio signal and process the same into electrical voice data. For example, the microphone 1710 may receive an audio signal (e.g., a voice command) from an external device or a user. The microphone 1710 may use various noise removal algorithms to remove noise added while the external audio signal is being received.

According to an embodiment of the disclosure, the user inputter 1700 may include a remote controller and a remote controller receiver 1720. The remote controller may include a power button, a voice recognition button, an operation mode button, a purify function button, a voice recognition microphone, a wind-free function button, a MAX button, a move and control button, a temperature and fan speed control button, and an additional function select button, but is not limited thereto. According to an embodiment of the disclosure, when the user utters a voice command while pressing the voice recognition button of the remote controller, the remote controller may recognize the voice command of the user. For example, the user may input a voice command such as 'Turn on the air conditioner', 'Turn off the air conditioner after 1 hour', or 'Operate in AI comfort mode' while pressing the voice recognition button of the remote controller. In this case, the remote controller may provide an answer by voice in response to the voice command of the user. For example, the remote controller may output voice such as "Operating in AI comfort mode. If you feel cold or hot at current temperature, try setting temperature manually".

The remote controller receiver 1720 may receive a control signal from the remote controller. For example, the remote controller receiver 1720 may receive a control signal input by the user, from the remote controller through infrared communication.

The memory 1800 may store programs for processing and control by the processor 1400, and store input/output data (e.g., operation mode information, user settings information, temperature data, humidity data, gas levels, notifications, filter replacement cycle information, device information, and fan speed information).

The memory 1800 may include at least one type of storage medium from among flash memory, a hard disk, a multimedia card micro, a memory card (e.g., a secure digital (SD) or extreme digital (XD) memory card), random access memory (RAM), static random access memory (SRAM), read-only memory (ROM), electrically erasable programmable read-only memory (EEPROM), programmable read-only memory (PROM), magnetic memory, a magnetic disk, and an optical disc. The programs stored in the memory 1800 may be classified into a plurality of modules depending on functions thereof. The memory 1800 may store at least one AI model.

The air conditioner 1000 may further include the power supply (not shown). The power supply (not shown) may supply power to the elements of the air conditioner 1000 under the control by the processor 1400. The power supply (not shown) may supply power input from an external power source through a power cord, to each element of the air conditioner 1000 under the control by the processor 1400.

Figure 23:
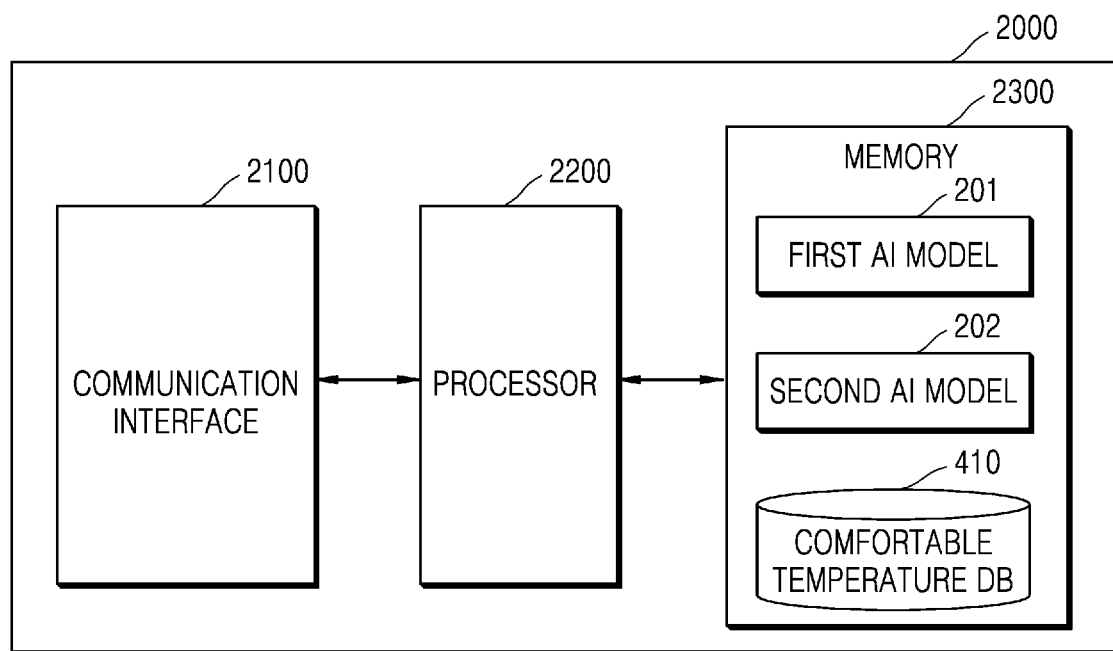
FIG. 23 is a block diagram for describing functions of a server device, according to an embodiment of the disclosure.

FIG. 23 is a block diagram for describing functions of the server device 2000, according to an embodiment of the disclosure.

Referring to FIG. 23, the server device 2000 may include a communication interface 2100, a processor 2200, and a memory 2300. However, not all of the illustrated elements are required. The server device 2000 may be implemented with more or less elements than the illustrated elements.

The elements of the server device 2000 will now be described one by one.

The communication interface 2100 may include one or more elements for enabling communication between the server device 2000 and the air conditioner 1000, between the server device 2000 and home appliances, or between the server device 2000 and the display device 3000.

According to an embodiment of the disclosure, the communication interface 2100 may receive, from the air conditioner 1000, current state information including at least one of operation time information of the air conditioner 1000, set temperature information of the air conditioner 1000, or current indoor temperature information. The communication interface 2100 may receive current humidity information, fan speed information, device information, and user settings information from the air conditioner 1000.

According to an embodiment of the disclosure, the communication interface 2100 may receive weather information, outdoor humidity information, and outdoor temperature information from an external server (e.g., a weather server). The communication interface 2100 may obtain indoor humidity information from an air purifier or a humidifier, and obtain, from a cooking appliance (e.g., a gas stove or an induction stove), information about whether the cooking appliance is used. The communication interface 2100 may obtain, from a home network system, information about whether a lighting device producing heat is used, and information about whether windows are open or closed.

The communication interface 2100 may receive location information of a user (e.g., home) from a mobile device of the user. The communication interface 2100 may receive context information of the user from the mobile device of the user. For example, the communication interface 2100 may receive, from the mobile device (e.g., a wearable device) of the user, context information indicating that the user is exercising (e.g., "Exercising"). In this case, the server device 2000 may identify that the user is exercising at home, based on the location information of the user and the context information of the user.

The communication interface 2100 may transmit a set temperature increase request to the air conditioner 1000 in response to the current state information. The communication interface 2100 may transmit a fan speed reduction request to the air conditioner 1000 in response to the current state information. The communication interface 2100 may transmit, to the air conditioner 1000, information about a timing to inquire again.

The communication interface 2100 may provide information about the air conditioner 1000 to the user through the display device 3000. For example, the communication interface 2100 may provide information related to an operation mode and energy consumption of the air conditioner 1000 by using a specific application executed by the display device 3000, but is not limited thereto.

The processor 2200 may control overall operation of the server device 2000 by using programs or information stored in the memory 2300. According to an embodiment of the disclosure, the processor 2200 may include an AI processor. The AI processor may be produced in the form of a dedicated hardware chip for AI or as a part of a general-purpose processor (e.g., a CPU or an application processor) or a dedicated graphics processor (e.g., a GPU), and be embedded in the server device 2000.

According to an embodiment of the disclosure, when the current state information is received from the air conditioner 1000, the processor 2200 may obtain a comfortable temperature graph from the first AI model 201, and obtain a first predicted temperature graph from the second AI model 202 based on the current state information. The comfortable temperature graph may include an unstable period in which a comfortable temperature changes based on an operation time of the air conditioner 1000, and a stable period in which the comfortable temperature is constantly maintained. The processor 2200 may obtain the comfortable temperature graph by applying at least one of operation timing information of the air conditioner 1000, fan speed information of the air conditioner 1000, indoor humidity information, outdoor humidity information, indoor temperature information, or outdoor temperature information to the first AI model 201. The processor 2200 may obtain the first predicted temperature graph by further applying at least one of operation timing information of the air conditioner 1000, indoor humidity information, outdoor temperature information, outdoor humidity information, weather information, performance information of the air conditioner 1000, or installation space information of the air conditioner 1000 to the second AI model 202, in addition to the current state information.

The processor 2200 may compare the comfortable temperature graph to the first predicted temperature graph. The processor 2200 may identify an overcooling period in which the first predicted temperature graph is reduced below the comfortable temperature graph, based on the comparison result. When the overcooling period is identified, the processor 2200 may transmit a set temperature increase request to the air conditioner 1000 through the communication interface 2100. In this case, the set temperature increase request may include information instructing to change the set temperature of the air conditioner 1000 to a first temperature. The processor 2200 may determine the first temperature from among one or more set temperatures, based on a result of comparing the comfortable temperature graph to one or more second predicted temperature graphs obtained by inputting the one or more set temperatures to the second AI model 202. A second predicted temperature graph obtained by applying the first temperature to the second AI model 202 may not be reduced below the comfortable temperature graph, and converge on the comfortable temperature graph.

The processor 2200 may generate a fan speed reduction request in response to the current state information. The fan speed reduction request may include information instructing to change the fan speed of the air conditioner 1000 to a first level. The processor 2200 may determine the first level by applying one or more fan speeds to the first and second AI models 201 and 202.

The memory 2300 may store programs for processing by the processor 2200, and store input/output data. For example, the memory 2300 may store the first AI model 201, the second AI model 202, and the comfortable temperature DB 410.

The first AI model 201 may be a model for inferring a comfortable temperature of the user. The first AI model 201 may be configured to generate a comfortable temperature graph including an unstable period and a stable period. The first AI model 201 may be configured by training an ANN model (e.g., a linear regression model or a DNN model) based on training data. The first AI model 201 may be refined through training based on updated training data. The training data may include condition information and comfortable temperature information. The condition information may include user settings information (e.g., a desired temperature set by a user and a timing when the user sets the desired temperature), environment information (e.g., an indoor temperature, an indoor humidity, an outdoor temperature, an outdoor humidity, an indoor-outdoor humidity difference, an indoor-outdoor temperature difference, and weather), and device information (e.g., a fan speed currently set in the air conditioner 1000), but is not limited thereto. For example, the condition information may further include time period information (e.g., morning, afternoon, evening, or dawn), season information, and activity information of the user (e.g., information about whether the user is exercising or cooking). The comfortable temperature information may include a temperature at which the user feels comfortable under each condition.

The first AI model 201 may obtain a comfortable temperature graph as an output value based on at least one of time information, environment information, or device information. The time information may include operation timing information of the air conditioner 1000 (e.g., an operation time point or time period). The environment information may include an indoor humidity, an outdoor humidity, an indoor temperature, an outdoor temperature, an indoor-outdoor temperature difference, an indoor-outdoor humidity difference, and weather. The device information may include fan speed information, device performance information, and device decrepitude information. The first AI model 201 may extract the comfortable temperature graph from the comfortable temperature DB 410, based on the time information, the environment information, and the device information.

The second AI model 202 may be a model for predicting indoor temperatures of future timings. The second AI model 202 may be configured by training an ANN model (e.g., a DNN model, an RNN model, or a CNN model) based on training data. The training data may include user settings information (e.g., a desired temperature set by a user and a timing when the user sets the desired temperature), environment information (e.g., an indoor temperature, an indoor humidity, an outdoor temperature, an outdoor humidity, an indoor-outdoor humidity difference, an indoor-outdoor temperature difference, and weather), device information (e.g., a fan speed currently set in the air conditioner 1000, and device performance), and space information (e.g., thermal insulation information, information about whether a lighting device is used, and information about whether windows are open or closed).

The second AI model 202 may obtain a predicted temperature graph as an output value based on time information, environment information, device information, and space information. According to an embodiment of the disclosure, not all of the time information, the environment information, the device information, and the space information may be applied to the second AI model 202, and only some of them may be applied. The time information may include operation time information of the air conditioner 1000, and operation timing information of the air conditioner 1000 (e.g., an operation time point or time period). The environment information may include an indoor humidity, an outdoor humidity, an indoor temperature, an outdoor temperature, an indoor-outdoor temperature difference, an indoor-outdoor humidity difference, and weather. The device information may include fan speed information set in the air conditioner 1000, set temperature information of the air conditioner 1000, device performance information, and device decrepitude information, but is not limited thereto. The space information may include information about a thermal insulation level, information about whether a cooking appliance producing heat (e.g., a gas stove or an induction stove) is used, information about whether a lighting device producing heat is used, and information about whether windows are open or closed, but is not limited thereto. The predicted temperature graph may be generated in various forms based on a set temperature of the air conditioner 1000, a fan speed, an operation time of the air conditioner 1000, and a current indoor temperature.

The comfortable temperature DB 410 may be a DB storing comfortable temperature graphs of the user under various conditions, and include a table in which the condition information is mapped to a comfortable temperature graph of the user. The condition information may include time information (e.g., operation timing information of the air conditioner 1000), environment information (e.g., an indoor humidity, an outdoor humidity, an indoor temperature, an outdoor temperature, an indoor-outdoor humidity difference, an indoor-outdoor temperature difference, and weather), and device information (e.g., fan speed information and performance information), but is not limited thereto.

The first AI model 201 may be trained based on training data to generate the comfortable temperature DB 410. According to an embodiment of the disclosure, the first AI model 201 may update the comfortable temperature DB 410 when the training data is added or updated.

According to an embodiment of the disclosure, the air conditioner 1000 may adjust a set temperature and/or a fan speed by using the first AI model 201 driven by the server device 2000 to infer a comfortable temperature and the second AI model 202 driven by the server device 2000 to predict an indoor temperature, in such a manner that a user does not experience discomfort due to overcooling.

The method according to an embodiment of the disclosure may be implemented in the form of program commands executable by various computer means and be recorded on a computer-readable medium. The computer-readable medium may include program commands, data files, data structures, or a combination thereof. The program commands recorded on the medium may be those specially designed and configured for the disclosure, or those known to and usable by one of ordinary skill in the art of computer software. Examples of the computer-readable recording medium include magnetic media (e.g., hard disks, floppy disks, and magnetic tape), optical media (e.g., CD-ROMs and DVDs), magneto-optical media (e.g., floptical disks), and hardware devices (e.g., ROMs, RAMs, and flash memories) that are specially configured to store and execute program commands. Examples of the program commands include both machine code, such as produced by a compiler, and high-level language code that may be executed by the computer using an interpreter.

An embodiment of the disclosure may be implemented in the form of a recording medium including computer-executable instructions, e.g., program modules executed by the computer. The computer-readable medium may be an arbitrary available medium that can be accessed by the computer, and examples thereof include all of volatile, nonvolatile, detachable, and non-detachable media. The computer-readable medium may include both of a computer storage medium and a communication medium. Examples of the computer storage medium include all of volatile, nonvolatile, detachable, and non-detachable media implemented using an arbitrary method or technology for storing information such as computer-readable instructions, data structures, program modules, or other data. The communication medium typically includes computer-readable instructions, data structures, program modules, other data in modulated data signals such as carrier waves, or other transmission mechanisms, and includes an arbitrary information delivery medium. An embodiment of the disclosure may also be implemented in the form of a computer program or a computer program product including computer-executable instructions, e.g., computer programs executed by the computer.

A machine-readable storage medium may be provided in the form of a non-transitory storage medium. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer for temporarily storing data.

According to an embodiment of the disclosure, the method according to various embodiments of the disclosure may be included and provided in a computer program product. The computer program product may be traded as a product between sellers and purchasers. The computer program product may be distributed in the form of a machine-readable storage medium (e.g., a compact disc read only memory (CD-ROM)), or be electronically distributed (e.g., downloaded or uploaded) via an application store or directly between two user devices (e.g., smartphones). For electronic distribution, at least a part of the computer program product (e.g., a downloadable app) may be temporarily generated or be at least temporarily stored in a machine-readable storage medium, e.g., a server of a manufacturer, a server of an application store, or a memory of a relay server.

While the disclosure has been particularly shown and described with reference to embodiments of the disclosure, it will be understood by one of ordinary skill in the art that various changes in form and details may be made therein without departing from the scope of the disclosure as defined by the following claims.

What is claimed is:

1. An air conditioner comprising:
   a communication interface to communicate with a server device;
   a memory to store one or more instructions; and
   at least one processor configured to execute the stored one or more instructions to:
      transmit, to the server device through the communication interface, current state information comprising one or more of operation time information of the air conditioner, set temperature information of the air conditioner, and current indoor temperature information;
      receive a set temperature increase request corresponding to the transmitted current state information from the server device through the communication interface; and
      adjust a set temperature of the air conditioner based on the received set temperature increase request,
   wherein a comfortable temperature graph is obtained from a first Artificial Intelligence (AI) model and a first predicted temperature graph is obtained from a second AI model based on the transmitted current state information,
   wherein the set temperature increase request is received when an overcooling period, in which the obtained first predicted temperature graph is reduced below the obtained comfortable temperature graph, is identified, and
   wherein the comfortable temperature graph comprises an unstable period in which a comfortable temperature changes based on an operation time of the air conditioner, and a stable period in which the comfortable temperature is constantly maintained.

2. The air conditioner of claim 1, wherein the comfortable temperature graph is obtained by applying one or more of operation timing information of the air conditioner, fan speed information of the air conditioner, indoor humidity information, outdoor humidity information, indoor temperature information, and outdoor temperature information to the first AI model.

3. The air conditioner of claim 1, wherein the set temperature increase request comprises information instructing to change the set temperature of the air conditioner to a first temperature, and
   wherein the first temperature is determined from among one or more set temperatures, based on a result of comparing the comfortable temperature graph to one or more second predicted temperature graphs obtained by inputting the one or more set temperatures to the second AI model.

4. The air conditioner of claim 3, wherein a second predicted temperature graph obtained by applying the first temperature to the second AI model is not reduced below the comfortable temperature graph and is closest to the comfortable temperature graph.

5. The air conditioner of claim 1, wherein the processor is further configured to execute the one or more instructions to:
   receive a fan speed reduction request from the server device corresponding to the transmitted current state information; and
   adjust a fan speed of the air conditioner based on the fan speed reduction request.

6. The air conditioner of claim 1, wherein the first predicted temperature graph is obtained by further applying one or more of operation timing information of the air conditioner, indoor humidity information, outdoor temperature information, outdoor humidity information, weather information, performance information of the air conditioner, and installation space information of the air conditioner to the second AI model.

7. An operating method of an air conditioner, the operating method comprising:
   transmitting, to a server device, current state information comprising one or more of operation time information of the air conditioner, set temperature information of the air conditioner, and current indoor temperature information;
   receiving a set temperature increase request corresponding to the transmitted current state information from the server device; and
   adjusting a set temperature of the air conditioner based on the received set temperature increase request,
   wherein a comfortable temperature graph is obtained from a first Artificial Intelligence (AI) model and a first predicted temperature graph is obtained from a second AI model based on the transmitted current state information,
   wherein the set temperature increase request is received when an overcooling period, in which the obtained first predicted temperature graph is reduced below the obtained comfortable temperature graph, is identified, and
   wherein the comfortable temperature graph comprises an unstable period in which a comfortable temperature changes based on an operation time of the air conditioner, and a stable period in which the comfortable temperature is constantly maintained.

8. The operating method of claim 7, wherein the comfortable temperature graph is obtained by applying one or more of operation timing information of the air conditioner, fan speed information of the air conditioner, indoor humidity information, outdoor humidity information, indoor temperature information, and outdoor temperature information to the first AI model.

9. The operating method of claim 7, wherein the set temperature increase request comprises information instructing to change the set temperature of the air conditioner to a first temperature, and
   wherein the first temperature is determined from among one or more set temperatures, based on a result of comparing the comfortable temperature graph to one or more second predicted temperature graphs obtained by inputting the one or more set temperatures to the second AI model.

10. The operating method of claim 9, wherein a second predicted temperature graph obtained by applying the first temperature to the second AI model is not reduced below the comfortable temperature graph and is closest to the comfortable temperature graph.

11. The operating method of claim 7, further comprising:
receiving a fan speed reduction request from the server device corresponding to the transmitted current state information; and
adjusting a fan speed of the air conditioner based on the fan speed reduction request.

12. The operating method of claim 7, wherein the first predicted temperature graph is obtained by further applying one or more of operation timing information of the air conditioner, indoor humidity information, outdoor temperature information, outdoor humidity information, weather information, performance information of the air conditioner, and installation space information of the air conditioner to the second AI model.

13. A control system comprising:
an air conditioner configured to transmit, to a server device, current state information comprising one or more of operation time information of the air conditioner, set temperature information of the air conditioner, and current indoor temperature information, and adjust a set temperature of the air conditioner based on a set temperature increase request, corresponding to the transmitted current state information, received from the server device; and
the server device configured to transmit the set temperature increase request to the air conditioner when an overcooling period, is identified,
wherein a comfortable temperature graph is obtained from a first Artificial Intelligence (AI) model and a first predicted temperature graph is obtained from a second AI model based on the transmitted current state information,
wherein the overcooling period is a period when the obtained first predicted temperature is reduced below the obtained comfortable temperature graph, and
wherein the comfortable temperature graph comprises an unstable period in which a comfortable temperature changes based on an operation time of the air conditioner, and a stable period in which the comfortable temperature is constantly maintained, and is obtained by applying one or more of operation timing information of the air conditioner, fan speed information of the air conditioner, indoor humidity information, outdoor humidity information, indoor temperature information, and outdoor temperature information to the first AI model.

14. The control system of claim 13, wherein the set temperature increase request comprises information instructing to change the set temperature of the air conditioner to a first temperature, and
wherein the server device is further configured to determine the first temperature from among one or more set temperatures, based on a result of comparing the comfortable temperature graph to one or more second predicted temperature graphs obtained by inputting the one or more set temperatures to the second AI model.

15. The control system of claim 14, wherein a second predicted temperature graph obtained by applying the first temperature to the second AI model is not reduced below the comfortable temperature graph and is closest to the comfortable temperature graph.

16. The control system of claim 13, wherein the air conditioner is further configured to receive a fan speed reduction request from the server device corresponding to the transmitted current state information, and adjust a fan speed of the air conditioner based on the fan speed reduction request.

17. The control system of claim 13, wherein the server device is further configured to obtain the first predicted temperature graph from the second AI model by further applying one or more of operation timing information of the air conditioner, indoor humidity information, outdoor temperature information, outdoor humidity information, weather information, performance information of the air conditioner, and installation space information of the air conditioner to the second AI model.

* * * * *